(12) United States Patent
Pena et al.

(10) Patent No.: US 10,794,510 B1
(45) Date of Patent: Oct. 6, 2020

(54) ELECTROHYDRAULIC COUNTERBALANCE AND PRESSURE RELIEF VALVE

(71) Applicant: Sun Hydraulics, LLC, Sarasota, FL (US)

(72) Inventors: Oscar Pena, Sarasota, FL (US); Bernd Zähe, Sarasota, FL (US)

(73) Assignee: Sun Hydraulics, LLC, Sarasota, FL (US)

( * ) Notice: Subject to any disclaimer, the term of this patent is extended or adjusted under 35 U.S.C. 154(b) by 210 days.

(21) Appl. No.: 15/847,997

(22) Filed: Dec. 20, 2017

(51) Int. Cl.
*F16K 31/06* (2006.01)

(52) U.S. Cl.
CPC ...... *F16K 31/0693* (2013.01); *F16K 31/0689* (2013.01)

(58) Field of Classification Search
USPC ............ 137/489.5, 488, 487.5, 487, 505.18, 137/492.5, 596.16, 486.14, 596.2; 60/272
See application file for complete search history.

(56) References Cited

U.S. PATENT DOCUMENTS

| | | |
|---|---|---|
| 2,379,181 A | 6/1945 | Pontius et al. |
| 2,575,272 A | 11/1951 | Harris |
| 2,687,869 A | 8/1954 | Kanuch |
| 3,033,228 A | 5/1962 | Forest |
| 3,381,931 A | 5/1968 | Boonshaft et al. |
| 4,289,160 A | 9/1981 | Kawasaki et al. |
| 4,303,197 A | 12/1981 | Sandau |
| 4,336,903 A | 6/1982 | Zirps |
| 4,351,356 A | 9/1982 | Koiwai et al. |
| 4,454,982 A | 6/1984 | Reick et al. |
| 4,456,170 A | 6/1984 | Weigle et al. |
| 4,494,726 A | 1/1985 | Kumar et al. |
| 4,679,765 A | 7/1987 | Kramer et al. |
| 5,048,790 A | 9/1991 | Wells |
| 5,051,631 A | 9/1991 | Anderson |
| 5,144,881 A | 9/1992 | Cakmaz |
| 5,195,556 A | 3/1993 | Fassbender |
| 5,404,902 A | 4/1995 | Wen |
| 5,769,386 A | 6/1998 | Sugiura et al. |
| 5,836,335 A | 11/1998 | Harms et al. |
| 5,842,679 A | 12/1998 | Kolchinsky |
| 6,039,070 A | 3/2000 | Zaehe |
| 6,378,557 B2 | 4/2002 | Kawamura et al. |
| 6,390,441 B2 | 5/2002 | Koyama et al. |
| 6,805,155 B2 | 10/2004 | Slawinski et al. |
| 6,957,656 B2 | 10/2005 | Tochiyama et al. |
| 6,986,498 B2 | 1/2006 | Hirota et al. |

(Continued)

*Primary Examiner* — Daphne M Barry
(74) *Attorney, Agent, or Firm* — McDonnell Boehnen Hulbert & Berghoff LLP

(57) ABSTRACT

An example valve includes a main stage, a pilot stage, and a solenoid actuator. The main stage includes a sleeve and a piston axially movable within the sleeve. The piston defines a cavity therein. The pilot stage includes a pilot pin received at, and axially movable in, the cavity of the piston, where the piston forms a pilot seat at which the pilot pin is seated when the valve is in a closed state. The solenoid actuator includes a solenoid coil, an armature, and a solenoid spring. The solenoid spring applies a biasing force in a distal direction on the pilot pin to seat the pilot pin at the pilot seat. Energizing the solenoid coil causes the armature to move in a proximal direction, thereby reducing the biasing force that the solenoid spring applies on the pilot pin.

20 Claims, 12 Drawing Sheets

(56) References Cited

U.S. PATENT DOCUMENTS

| | | |
|---|---|---|
| 7,051,857 B2 | 5/2006 | Babin |
| 7,779,853 B2 | 8/2010 | Reilly et al. |
| 7,841,360 B2 | 11/2010 | Bruck et al. |
| 7,975,981 B2 | 7/2011 | Harrison, Jr. |
| 7,984,890 B2 | 7/2011 | Pfaff et al. |
| 8,375,981 B2 | 2/2013 | Jeon |
| 8,733,391 B2 | 5/2014 | Jeon |
| 8,757,208 B2 * | 6/2014 | Dornbach .............. F16K 27/041 137/625.61 |
| 10,437,269 B1 * | 10/2019 | Zahe ..................... F16K 17/105 |
| 10,495,117 B1 * | 12/2019 | Pena ....................... F15B 13/01 |
| 10,533,584 B1 * | 1/2020 | Zahe ..................... F16K 17/105 |
| 2003/0106588 A1 | 6/2003 | Zahe |
| 2003/0131889 A1 | 7/2003 | Kim |
| 2005/0178443 A1 | 8/2005 | Cheong |
| 2005/0183775 A1 | 8/2005 | Cheong |
| 2006/0201554 A1 | 9/2006 | Prinsen et al. |
| 2006/0266419 A1 | 11/2006 | Krug-Kussius |
| 2009/0050222 A1 | 2/2009 | Jackson et al. |
| 2010/0294380 A1 | 11/2010 | Nagata et al. |
| 2011/0139260 A1 | 6/2011 | Dornbach et al. |
| 2014/0299197 A1 | 10/2014 | Dornbach et al. |

\* cited by examiner

ELECTROHYDRAULIC COUNTERBALANCE AND PRESSURE RELIEF VALVE

BACKGROUND

Counterbalance valves are hydraulic valves configured to hold and control negative or gravitational loads. They may be configured to operate, for example, in applications that involve the control of suspended loads, such as mechanical joints, lifting applications, extensible movable bridge, winches, etc.

In some applications, the counterbalance valve, which may also be referred to as an overcenter valve, could be used as a safety device that prevents an actuator from moving if a failure occurs (e.g., a hose burst) or could be used as a load holding valve (e.g., on a boom cylinder of a mobile machinery). The counterbalance valve allows cavitation-free load lowering, preventing the actuator from overrunning when pulled by the load (gravitational load).

As an example, a pilot-operated counterbalance valve could be used on the return side of a hydraulic actuator for lowering a large negative load in a controlled manner. The counterbalance valve generates a preload or back-pressure in the return line that acts against the main drive pressure so as to maintain a positive load, which therefore remains controllable. Particularly, if a speed of a piston of the cylinder increases, pressure on one side of the cylinder (e.g., rod side) may drop and the counterbalance valve may then act to restrict the flow to controllably lower the load.

When a directional control valve is operating in a load-lowering mode, the pilot-operated counterbalance valve is opened by a pressurized pilot line. To protect both directions of motion of a fluid receiving device against a negative load, a counterbalance valve may be assigned to each of the ports of the fluid receiving device. Each counterbalance valve assigned to a particular port may then be controlled open via cross-over by the pressure present at the other port. In other words, a respective pressurized pilot line that, when pressurized, opens a counterbalance valve is connected to a supply line connected to the other port.

SUMMARY

The present disclosure describes implementations that relate to an electrohydraulic counterbalance and pressure relief Valve. In a first example implementation, the present disclosure describes a valve. The valve includes: (i) a housing having a pilot port on an exterior peripheral surface of the housing; (ii) a piston axially movable within a sleeve disposed in the housing, where the sleeve defines a first port and a second port, and where the piston defines a cavity therein; (iii) a pilot pin received at, and axially movable in, the cavity of the piston, where the piston forms a pilot seat at which the pilot pin is seated when the valve is in a closed state; and (iv) a solenoid actuator comprising a solenoid coil, an armature, and a solenoid spring, where the solenoid spring applies a biasing force on the pilot pin in a distal direction to seat the pilot pin at the pilot seat. When pressurized fluid is received at the first port, the pressurized fluid applies a first force on the pilot pin in a proximal direction opposite the distal direction, and when a pilot pressure fluid signal is received through the pilot port of the housing, the pilot pressure fluid signal applies a second force on the pilot pin in the proximal direction, such that when the first force and the second force overcome the biasing force of the solenoid spring, the pilot pin moves axially in the proximal direction off the pilot seat, thereby causing the piston to follow the pilot pin in the proximal direction allowing flow from the first port to the second port. When an electric signal is provided to the solenoid coil, the armature applies a third force on the solenoid spring in the proximal direction, thereby reducing the biasing force that the solenoid spring applies on the pilot pin.

In a second example implementation, the present disclosure describes another valve. The valve includes: (i) a housing having a pilot port on an exterior peripheral surface of the housing; (ii) a main stage comprising: (a) a main sleeve disposed in the housing and defining a first port and a second port, and (b) a piston axially movable within the main sleeve, where the piston defines a cavity therein; (iii) a pilot stage comprising a pilot pin received at, and axially movable in, the cavity of the piston, where the piston forms a pilot seat at which the pilot pin is seated when the valve is in the closed state; and (iv) a solenoid actuator comprising a solenoid coil, an armature, a solenoid spring, and a solenoid sleeve coupled to the armature, where the solenoid sleeve houses the solenoid spring and interfaces therewith, where the solenoid spring applies a biasing force in a distal direction on the pilot pin to seat the pilot pin at the pilot seat, where energizing the solenoid coil causes the armature and the solenoid sleeve coupled thereto to move in a proximal direction, thereby compressing the solenoid spring in the proximal direction and reducing the biasing force that the solenoid spring applies on the pilot pin.

In a third example implementation, the present disclosure describes a hydraulic system including: a source of pressurized fluid; a reservoir; a hydraulic actuator having a first chamber and a second chamber; a directional control valve configured to direct fluid flow from the source of pressurized fluid to the first chamber of the hydraulic actuator; and a valve configured to control fluid flow from the second chamber. The valve includes (i) a housing having a pilot port on an exterior peripheral surface of the housing, where the pilot port is fluidly coupled to the first chamber of the hydraulic actuator; (ii) a main stage comprising: (a) a main sleeve defining a first port and a second port, where the first port is fluidly coupled to the second chamber, and where the second port is fluidly coupled to the reservoir, and (b) a piston axially movable within the main sleeve, where the piston defines a cavity therein; (iii) a pilot stage comprising a pilot pin received at, and axially movable in, the cavity of the piston, where the piston forms a pilot seat at which the pilot pin is seated when the valve is in the closed state, where the pilot pin is subjected to pressurized fluid received at the first port and subjected to a pilot pressure fluid signal received at the pilot port; and (iv) a solenoid actuator comprising a solenoid coil, an armature, a solenoid spring, and a solenoid sleeve coupled to the armature and configured to house the solenoid spring. The solenoid spring applies a biasing force in a distal direction on the pilot pin to seat the pilot pin at the pilot seat, where energizing the solenoid coil causes the armature and the solenoid sleeve coupled thereto to move in a proximal direction, thereby compressing the solenoid spring and reducing the biasing force that the solenoid spring applies on the pilot pin.

The foregoing summary is illustrative only and is not intended to be in any way limiting. In addition to the illustrative aspects, implementations, and features described above, further aspects, implementations, and features will become apparent by reference to the figures and the following detailed description.

DETAILED DESCRIPTION

A counterbalance valve may have a spring that acts against a movable element (e.g., a spool or a poppet), and the force of the spring determines a pressure setting of the counterbalance valve. The pressure setting is a pressure level that causes the counterbalance valve to open and allow fluid flow therethrough. In examples, the counterbalance valve is configured to have a pressure setting that is higher (e.g., 30% higher) than an expected maximum induced pressure in an actuator controlled by the counterbalance valve.

However, this configuration may render operation of the counterbalance valve energy inefficient. Particularly, the expected maximum induced pressure might not occur in all working conditions, and configuring the counterbalance valve to handle the expected maximum induced pressure may cause a large amount of energy loss.

For instance, an actuator may operate a particular tool that experiences a high load in some cases; however, the actuator may operate another tool that experiences small load in other cases. In the cases where the actuator operates a tool that experiences a small load, having the counterbalance valve with a high pressure setting is inefficient. The hydraulic system provides a high pilot pressure to open the counterbalance valve, and the counterbalance generates a large backpressure thereby causing the system to consume an extra amount of power or energy that could have been avoided if the counterbalance valve has a lower pressure setting.

As another example, an actuator of a mobile machinery may be coupled to the machine at a hinge and as the actuator rotates about the hinge the kinematics of the actuator change, and the load may increase or decrease based on the rotational position of the actuator. In some rotational positions, the load may be large causing a high induced pressure, but in other rotational positions the load may be small causing a low induced pressure.

Configuring the counterbalance valve to handle the large load and high induced pressure renders operation of the hydraulic system inefficient when the load is small. Due to the high pressure setting of the counterbalance valve, a large pilot pressure is provided to open the counterbalance valve and a large backpressure is generated, whereas for the small load a low pilot pressure could have been used. The increased pressure level multiplied by flow through the actuator results in energy loss that could have been avoided if the pressure setting of the counterbalance valve is lowered based on conditions of the hydraulic system.

Therefore, it may be desirable to have a counterbalance valve with a pressure setting that could be varied during operation of the hydraulic system. Such variation could render the hydraulic system more efficient.

Figure 1:
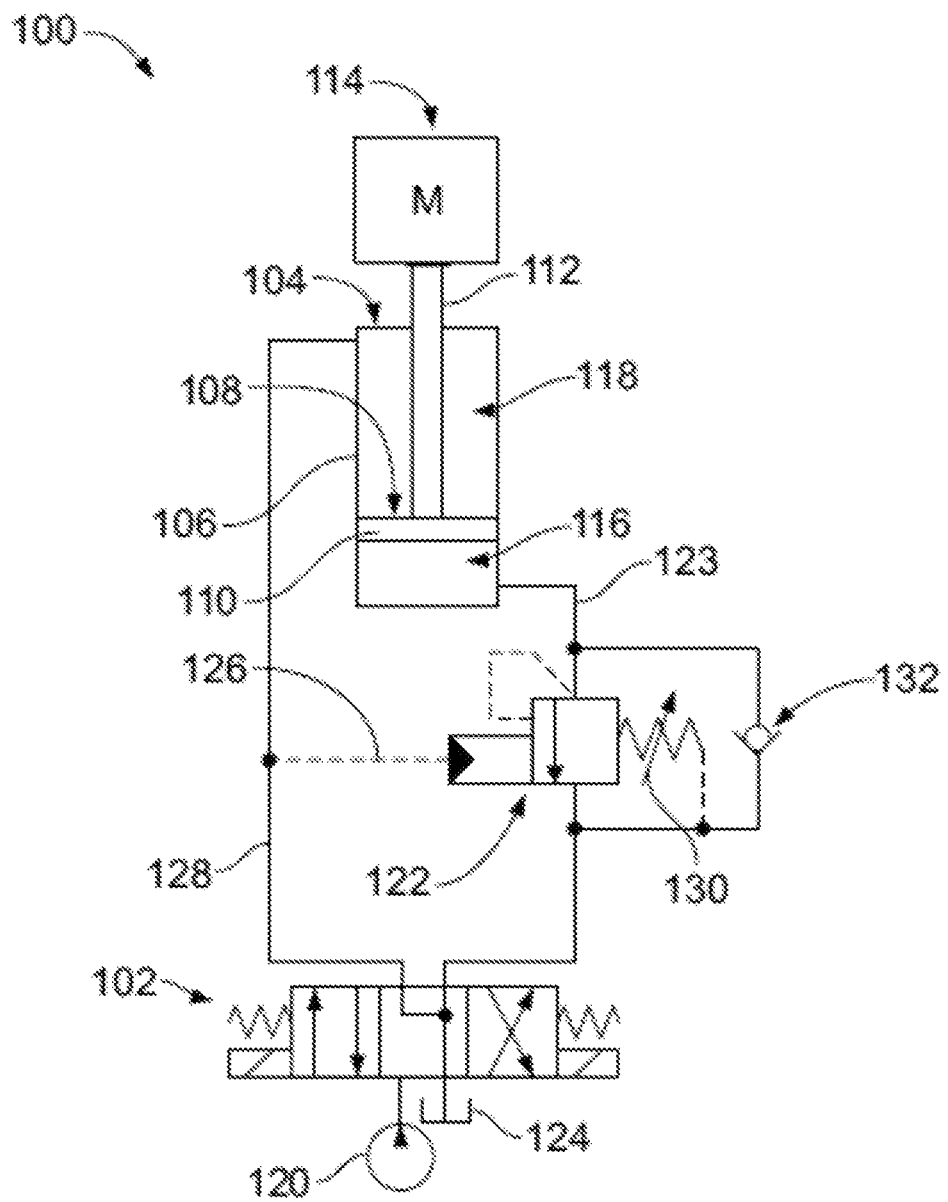
FIG. 1 illustrates a hydraulic circuit, in accordance with an example implementation.

FIG. 1 illustrates a hydraulic circuit 100, in accordance with an example implementation. The hydraulic circuit 100 includes a directional control valve 102 configured to control flow to and from an actuator 104. The actuator 104 includes a cylinder 106 and a piston 108 slidably accommodated in the cylinder 106. The piston 108 includes a piston head 110 and a rod 112 extending from the piston head 110 along a central longitudinal axis direction of the cylinder 106. The rod 112 is coupled to a load 114. The piston head 110 divides the inside of the cylinder 106 into a first chamber 116 and a second chamber 118.

In an example operation, the direction control valve 102 directs fluid flow received from a source of pressurized fluid, such as a pump 120, to the second chamber 118 to lower the load 114, where the load 114 is a negative load that acts with gravity. Thus, the weight of the load 114 may force fluid out of the first chamber 116 causing the load to drop uncontrollably. Further, flow from the pump 120 might not be able to keep up with movement of the piston 108, causing cavitation in the second chamber 118.

To avoid uncontrollable lowering of the load 114 and cavitation in the second chamber 118, a counterbalance valve 122 is installed in a hydraulic line 123 leading from the first chamber 116 to the directional control valve 102. The counterbalance valve 122 is configured to control or restrict fluid forced out of the first chamber 116. Fluid exiting the counterbalance valve 122 then flows through the direction control valve 102 to a reservoir or tank 124.

A pilot line 126 tapped from a hydraulic line 128 connecting the directional control valve 102 to the actuator 104 is fluidly coupled to a pilot port of the counterbalance valve 122. A pilot pressure fluid signal received through the pilot line 126 acts together with the pressure induced in the first chamber 116 and the hydraulic line 123 due to the load 114, against a force generated by a setting spring 130 of the counterbalance valve 122. The combined action of the pilot pressure fluid signal and the induced pressure in the first chamber 116 facilitates opening the counterbalance valve 122 to allow flow therethrough.

The counterbalance valve 122 is characterized by a ratio between a first differential surface area on which the pilot pressure fluid signal acts and a second differential surface area on which the pressure induced by the load 114 acts within the counterbalance valve 122. Such ratio may be referred to as "pilot ratio."

Because the pilot pressure fluid signal acts against the setting spring 130, the pilot pressure fluid signal effectively reduces the pressure setting determined by a spring rate of the setting spring 130. The extent of reduction in the pressure setting is determined by the pilot ratio. For example, if the pilot ratio is 3 to 1 (3:1), then for each 10 bar increase in pressure level of the pilot pressure fluid signal, the pressure setting of the setting spring 130 is reduced by 30 bar. As another example, if the pilot ratio is 8 to 1 (8:1), then for each 10 bar increase in the pressure level of pilot pressure fluid signal, the pressure setting of the setting spring 130 is reduced by 80 bar.

If the piston 108 tends to increase its speed, pressure level in the second chamber 118, the hydraulic line 128, and the pilot line 126 may decrease. As a result, the counterbalance valve 122 restricts fluid flow therethrough to preclude the load 114 from dropping at large speeds (i.e., precludes the load 114 and the actuator 104 from overrunning).

Although the hydraulic circuit 100 depicts one counterbalance valve 122, in other examples, the hydraulic circuit 100 may include a second counterbalance valve configured to control fluid flow forced out of the second chamber 118 when the piston 108 extends. In these examples, the counterbalance valve 122 may be configured to allow fluid flow through a free-flow check valve 132 from the directional control valve 102 to the first chamber 116. The second counterbalance valve and associated hydraulic line connections are not shown in FIG. 1 to reduce visual clutter in the drawings.

The pressure setting determined by the spring rate of the setting spring 130 is selected such that the counterbalance valve 122 is configured to hold a maximum expected load. For example, if a diameter of the piston head 110 is 40 millimeter (mm) and a diameter of the rod 112 is 28 mm, then an annular area of the piston 108 (e.g., surface area of the piston head 110 minus a cross-sectional area of the rod 112) is equal to 640.56 millimeter squared. Thus, for an example maximum value of the load 114 being 10 kilo Newton (kN), the maximum induced pressure in the first chamber 116 can be estimated as the maximum force divided by the annular area and is thus equal to about 156 bar.

The setting spring 130 is selected to cause the counterbalance valve 122 to have a pressure setting that is higher than the maximum induced pressure so as to be able to hold the load 114. For example, the setting spring 130 may be selected to cause the counterbalance valve 122 to have a pressure setting of 210 bar.

As such, to open the counterbalance valve 122 and allow flow therethrough, the pilot pressure fluid signal and the induced pressure in the second chamber 118 apply respective forces within the counterbalance valve 122 that overcome the force caused by the setting spring 130. This configuration may render the hydraulic circuit 100 inefficient.

Particularly, in some cases, the load 114 might not be an overrunning load (i.e., the load 114 may be a positive load), and thus the induced pressure in the second chamber 118 may be low. In these cases, to open the counterbalance valve 122, a high pilot pressure is generated in the hydraulic line 128 and is tapped therefrom to be communicated through the pilot line 126 to the pilot port of the counterbalance valve 122. In other words, the pressure level in the hydraulic line 128 rises to provide the high pilot pressure to open the counterbalance valve when the load 114 is not an overrunning load. If the pressure setting determined by the setting spring 130 is lower, then a lower pilot pressure could have opened the counterbalance valve 122.

Fluid power is estimated by a multiplication of pressure level and flow rate through the hydraulic system. Thus, if pressure level is decreased, then the power that the pump 120 consumes to generate the fluid having sufficient power to operate the actuator 104 is also decreased and the hydraulic circuit 100 may operate more efficiently.

Therefore, it may be desirable to configure the counterbalance valve 122 such that the pressure setting of the setting spring 130 can be adjusted during operation of the hydraulic circuit 100. For example, an electronic controller of the hydraulic circuit 100 may be in communication with pressure sensors or load sensors coupled to the actuator 104. The controller may then adjust the pressure setting based on sensor information indicating the pressure level in the first chamber 116 or indicating the magnitude of the load 114. Thus, for positive loads and low pressure levels in the first chamber 116, the pressure setting could be reduced to render the hydraulic circuit 100 more efficient. The controller may continually adjust the pressure setting of the setting spring 130 during operation of the hydraulic circuit 100 based on the sensor information.

Further, changing pressure setting based on load conditions may enhance stability of the counterbalance valve 122. Enhanced stability of the counterbalance valve 122 indicates fewer oscillations in movable elements of the counterbalance valve 122, and thus fewer oscillations in inlet, pilot, and outlet pressure levels of the counterbalance valve 122. The stability of the counterbalance valve 122 may be based on several factors including the pressure setting, the pilot ratio, and the capacity of the counterbalance valve 122. In examples, a lower pressure setting may enhance stability of the counterbalance valve 122. Also, in examples, a lower pilot ratio may enhance stability of the counterbalance valve 122. Similarly, in examples, a lower capacity (smaller flow rate through the counterbalance valve 122) for a given pilot ratio may enhance stability of the counterbalance valve 122.

Further, stability of the counterbalance valve 122 may be based on whether the pilot pressure fluid signal received through the pilot line 126 and the induced pressure of fluid received from the first chamber 116 act on the same movable element or act on different respective movable elements within the counterbalance valve 122. In examples, configuring the counterbalance valve 122 such that the pilot pressure fluid signal acts on a movable element different from the movable element on which the induced pressure from the first chamber 116 acts may enhance stability of the counterbalance valve 122.

Disclosed herein is a counterbalance and relief valve that is configured to have an adjustable pressure setting and having enhanced stability.

Figure 2:
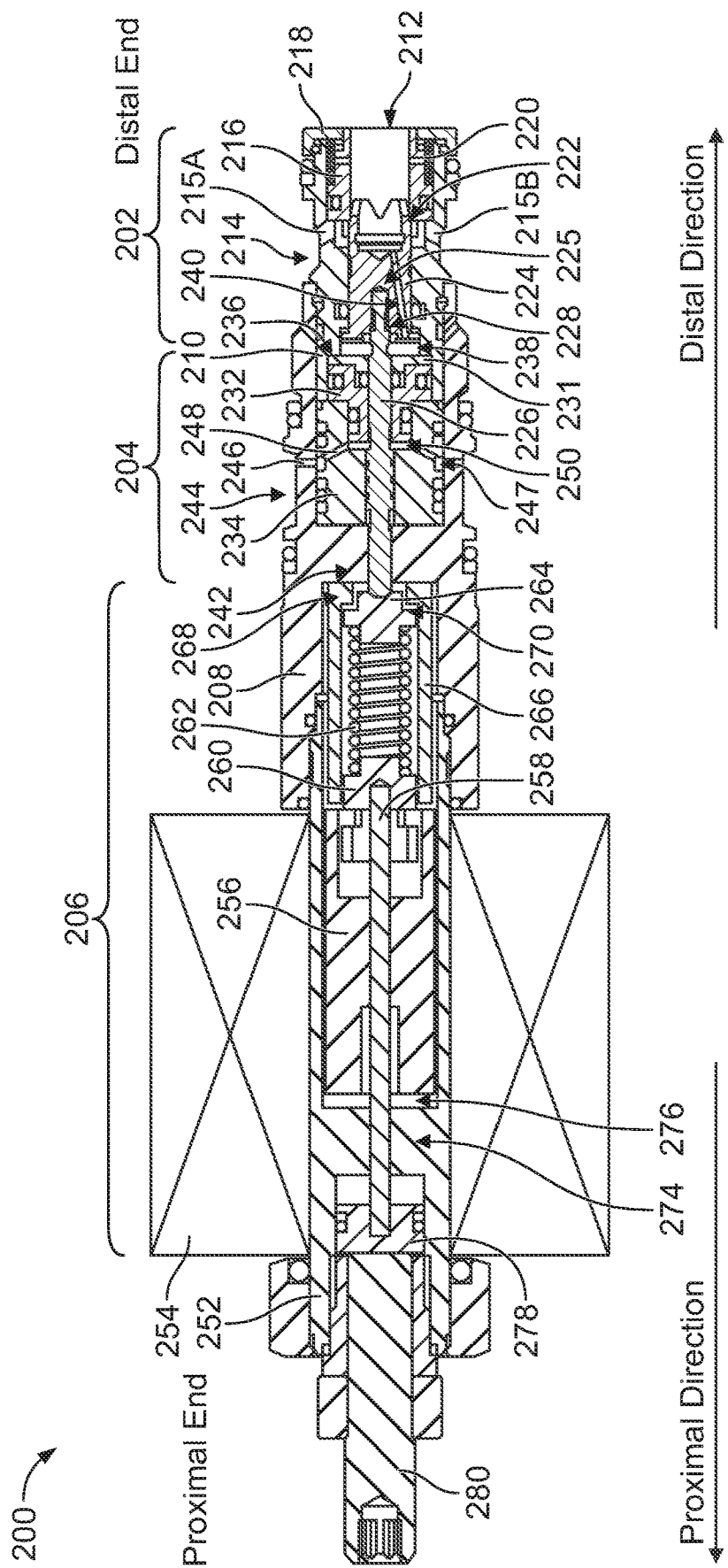
FIG. 2 illustrates a cross-sectional side view of a valve in a closed position, in accordance with an example implementation.

FIG. 2 illustrates a cross-sectional side view of a valve 200 in a closed position, in accordance with an example implementation. The valve 200 may be inserted or screwed into a manifold having ports corresponding to ports of the valve 200 described below, and may thus fluidly couple the valve 200 to other components of a hydraulic system.

The valve 200 may include a main stage 202, a pilot stage 204, and a solenoid actuation mechanism 206. The valve 200 includes a housing 208 that defines a longitudinal cylindrical cavity therein. The longitudinal cylindrical cavity of the housing 208 is configured to house portions of the main stage 202, the pilot stage 204, and the solenoid actuation mechanism 206.

The main stage 202 includes a main sleeve 210 received at a distal or first end of the housing 208, and the main sleeve 210 is coaxial with the housing 208. The main sleeve 210 defines a first port 212 and a second port 214. The first port 212 is defined at a nose of the main sleeve 210 and can be referred to as a load port, for example. The second port 214 may include a set of cross holes such as cross holes 215A, 215B disposed in a radial array about an exterior surface of the main sleeve 210. In examples, the second port 214 could be referred to as a tank port or exhaust port.

The main sleeve 210 defines a respective longitudinal cylindrical cavity therein. A reverse flow piston 216 is disposed, and slidably accommodated, within the cavity of the main sleeve 210. The reverse flow piston 216 is coaxial with the housing 208 and the main sleeve 210.

A ring-shaped stopper 218 is fixedly disposed at a distal end (nose) of the main sleeve 210, and the ring-shaped stopper 218 protrudes radially in the cavity of the main sleeve 210 to form a support for a distal end of a reverse flow check spring 220. A proximal end of the reverse flow check spring 220 acts against a shoulder formed as a rim or protrusion projecting from the reverse flow piston 216. With this configuration, the distal end of the reverse flow check spring 220 is fixed, whereas the proximal end of the reverse flow check spring 220 is free and interfaces with the reverse flow piston 216. Thus, the reverse flow check spring 220 biases the reverse flow piston 216 in a proximal direction (e.g., to the left in FIG. 2).

The valve 200 includes a piston 224 disposed, and slidably accommodated, in the cavity of the main sleeve 210. The piston 224 is longitudinally adjacent to the reverse flow piston 216 in the cavity of the main sleeve 210. An interior peripheral surface of the reverse flow piston 216 at a proximal end thereof forms a piston seat 222 for the piston 224. In the closed position shown in FIG. 1, the piston 224 is seated on the piston seat 222. The piston 224 can also be referred to as a main piston.

The piston 224 defines a cavity 225 therein configured as a longitudinal blind hole that receives a distal end of a pilot pin 226. The pilot pin 226 is slidably accommodated within the cavity of the piston 224 and is seated at a pilot seat 228 formed on an interior surface of the piston 224 at a proximal end of the piston 224.

Figure 3:
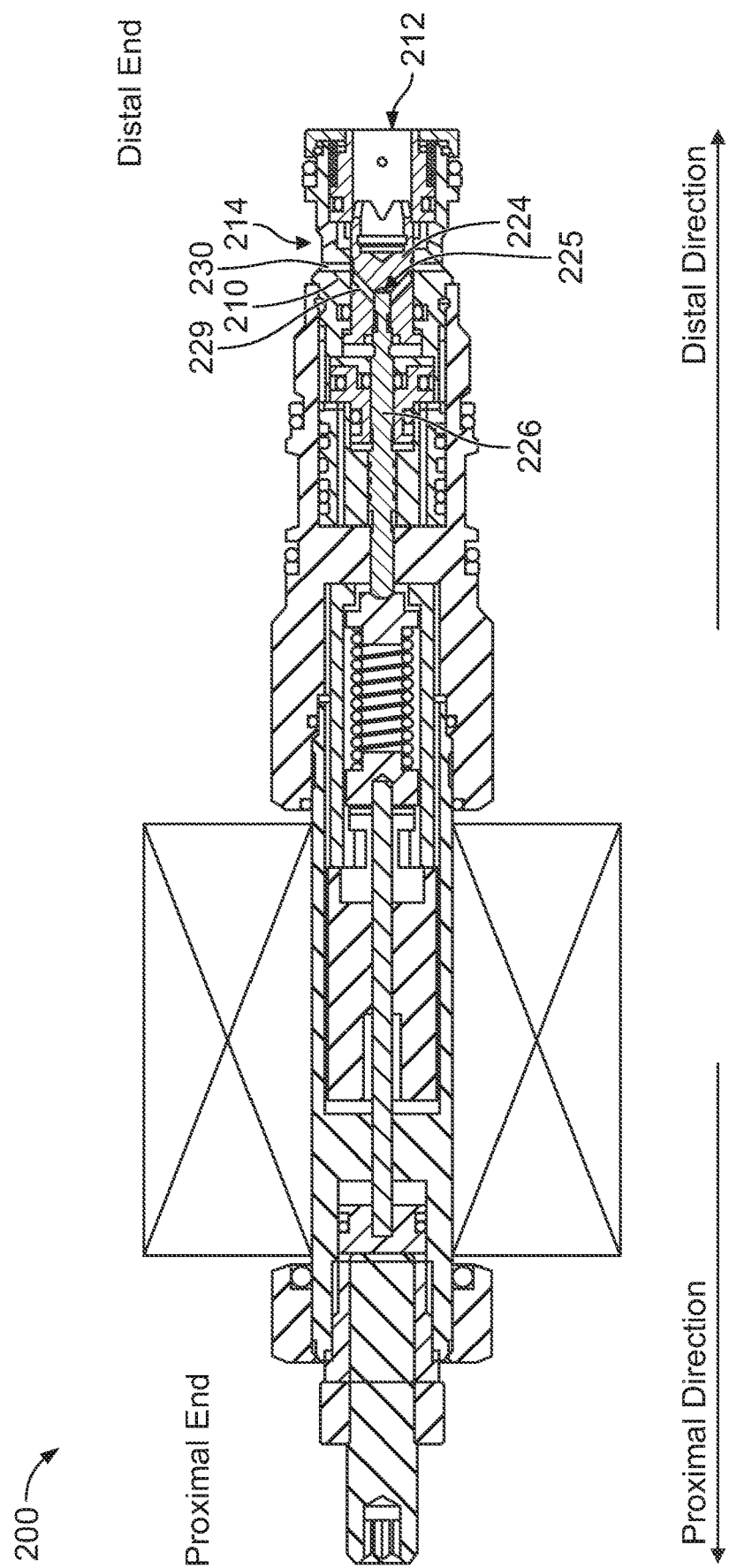
FIG. 3 illustrates a cross-sectional bottom view of the valve shown in FIG. 2 in a closed position, in accordance with another example implementation.

Further, the cavity 225 of the piston 224 that receives the pilot pin 226 therein is fluidly coupled to the second port 214. FIG. 3 illustrates a cross-sectional bottom view of the valve 200 in a closed position, in accordance with an example implementation. As shown in the bottom view of FIG. 3, a slanted channel 229 formed in the piston 224 fluidly couples the cavity 225 that receives the distal end of the pilot pin 226 to the second port 214 via cross holes disposed in the main sleeve 210 such as cross hole 230.

Referring back to FIG. 2, the valve 200 includes three spacers disposed in the longitudinal cavity of the housing 208 axially adjacent to the piston 224. A first spacer 231 is ring-shaped and is disposed within the main sleeve 210. A second spacer 232 is also ring-shaped adjacent to and abuts the first spacer 231. The second spacer 232 is disposed partially within the longitudinal cavity of the main sleeve 210 and partially within the longitudinal cavity of the housing 208. A third spacer 234 is adjacent to and abuts the second spacer 232 and also abuts a proximal end of the main sleeve 210. The third spacer 234 is disposed within the longitudinal cavity of the housing 208. The pilot pin 226 is disposed through the three spacers 231, 232, and 234. In other words, the three spacers 231, 232, and 234 form a channel bound by the interior peripheral surfaces of the three spacers 231, 232, and 234, and the pilot pin 226 is disposed through the channel.

The first spacer 231 is secured against a protrusion 236 formed on an interior peripheral surface of the main sleeve 210. With this configuration, the first spacer 231 is separated from the piston 224 via a chamber 238. The chamber 238 is fluidly coupled to the first port 212 via a slanted channel 240 formed in the piston 224.

The housing 208 forms a protrusion 242 from an interior peripheral surface of the housing 208 to form a hole or channel through which the pilot pin 226 is disposed. A distal end of the protrusion 242 forms a shoulder against which the third spacer 234 is secured. With this configuration, the three spacers 231, 232, and 234 are fixed and bound between the protrusion 236 and the protrusion 242.

The housing 208 further defines a pilot port 244 on an exterior peripheral surface of the housing 208. Cross holes such as cross hole 246 are disposed in the housing 208 and configured to communicate a pilot pressure fluid signal received at the pilot port 244 to an annular groove 247 defined on the exterior peripheral surface of the third spacer 234. A slanted channel 248 then communicates the pilot pressure fluid signal from the annular groove 247 to a chamber or gap 250 formed between the second spacer 232 and the third spacer 234.

The solenoid actuation mechanism 206 includes a solenoid tube 252 disposed within and received at the proximal end of the housing 208, such that the solenoid tube 252 is coaxial with the housing 208. A solenoid coil 254 is disposed about an exterior surface of the solenoid tube 252.

The solenoid tube 252 is configured to house an armature 256. The armature 256 defines therein a longitudinal channel through which a solenoid pin 258 is disposed. The solenoid pin 258 is slidably accommodated within the armature 256, and the armature 256 and the solenoid pin 258 are configured to move axially relative to each other.

A distal end of the solenoid pin 258 is coupled to a first or proximal spring cap 260 disposed against and supporting a proximal end of a solenoid spring 262. A distal end of the solenoid spring 262 is secured against a second or distal spring cap 264.

The solenoid actuation mechanism 206 further includes a solenoid sleeve 266 disposed and received at the proximal end of the housing 208 and also disposed partially within a distal end of the solenoid tube 252. The solenoid sleeve 266 has a protrusion 268 at a distal end of the solenoid sleeve 266. The distal spring cap 264 has a flanged portion 270 that interfaces with and rests against the protrusion 268 of the solenoid sleeve 266 when the valve 200 is in the closed position shown in FIGS. 2-3.

Figure 4:
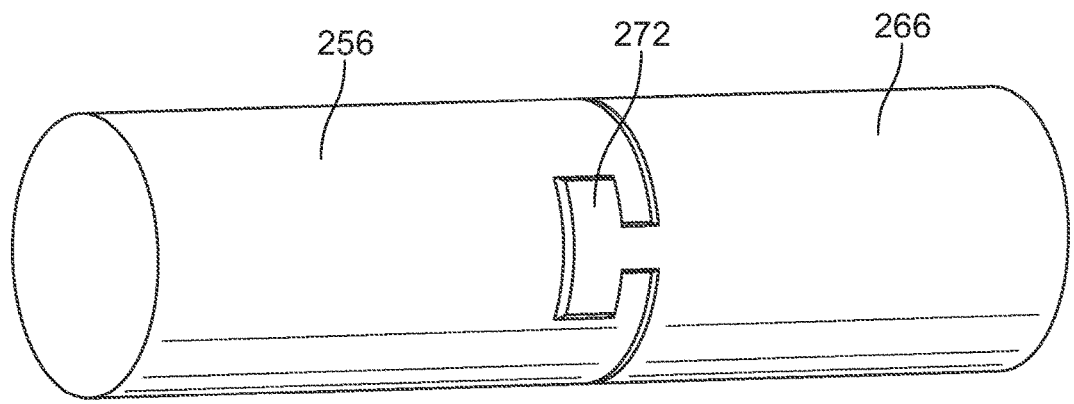
FIG. 4 illustrates a three-dimensional view showing an armature coupled to a sleeve, in accordance with an example implementation.

The armature 256 is coupled to the solenoid sleeve 266. As such, if the armature 256 moves axially (e.g., in the proximal direction), the solenoid sleeve 266 moves along with the armature 256 in the same direction. The armature 256 can be coupled to the solenoid sleeve 266 in several ways. FIG. 4 illustrates a three-dimensional view showing the armature 256 coupled to the solenoid sleeve 266, in accordance with an example implementation. As shown, the solenoid sleeve 266 may have a male T-slot 272, and the armature 256 may have a corresponding female T-slot configured to receive the male T-slot of the solenoid sleeve 266. With this configuration, the armature 256 and solenoid sleeve 266 are coupled to each other, such that if the armature 256 moves, the solenoid sleeve 266 moves therewith. The configuration shown in FIG. 4 is an example for illustration only, and other fastening configurations could be used to couple the solenoid sleeve 266 to the armature 256.

Referring back to FIG. 2, the solenoid tube 252 includes a pole piece 274 separated from the armature 256 by an airgap 276. The pole piece 274 may be composed of material of high magnetic permeability. The pole piece 274 is shown in FIG. 2 as an integral part of the solenoid tube 252. In other example implementations, however, the pole piece could be a separate component.

The pole piece 274 defines therein a channel through which the solenoid pin 258 is disposed. While a distal end of the solenoid pin 258 is coupled to the proximal spring cap 260, a proximal end of the solenoid pin 258 is coupled to a plunger or plug 278 that interfaces with a set screw 280 disposed at a proximal end of the valve 200. Once the set screw 280 is screwed into the valve 200 to a particular axial position, the set screw 280 and the plug 278 assume a particular fixed position. As a result, the solenoid pin 258 and the proximal spring cap 260 coupled thereto also assume a fixed position. With this configuration, the proximal end of the solenoid spring 262 resting against the proximal spring cap 260 is fixed, whereas the distal end of the solenoid spring 262 resting against the distal spring cap 264 is movable and biases the distal spring cap 264 and the solenoid sleeve 266 in the distal direction. As such, the solenoid spring 262 applies a biasing or preload force on the distal spring cap 264.

As described above, a distal end of the pilot pin 226 is received within the piston 224. A proximal end of the pilot pin 226 interfaces with the distal spring cap 264. As the solenoid spring 262 applies the biasing force to the distal spring cap 264, the force is transferred to the pilot pin 226. With this configuration, the solenoid spring 262 applies the biasing or preload force on the pilot pin 226, thus causing the pilot pin 226 to be seated at the pilot seat 228 of the piston 224, and thereby biasing the piston 224 to be seated at the piston seat 222.

The biasing force of the solenoid spring 262 determines the pressure setting of the valve 200 as described below with respect to FIG. 6. The solenoid spring 262 can thus be referred to as the setting spring.

The set screw 280 is configured as a mechanical or manual adjusting the maximum pressure setting of the valve 200. For example, if the set screw 280 is rotated in a first direction (e.g., in a clockwise direction), the set screw 280 may move axially in the distal direction (e.g., to the right in FIG. 2) pushing the plug 278 and the solenoid pin 258 in the distal direction. The solenoid pin 258 in turn pushes the proximal spring cap 260 in the distal direction, thus compressing the solenoid spring 262 and increasing the preload or biasing force of the solenoid spring 262.

Conversely, rotating the set screw 280 in a second direction (e.g., counter-clockwise) causes the set screw 280 to move axially in the proximal direction, allowing the solenoid spring 262 to push the proximal spring cap 260, the solenoid pin 258, and the plug 278 in the proximal direction. The length of the solenoid spring 262 thus increases and the preload or biasing force of the solenoid spring 262 is reduced. With this configuration, the biasing force of the solenoid spring 262, and thus the pressure setting of the valve 200, can be adjusted via the set screw 280.

The valve 200 is configured to operate in different modes of operation. For example, the valve 200 may be used as a counterbalance valve, such as the counterbalance valve 122. In this example, the valve 200 may be installed in the hydraulic circuit 100 such that the first port 212 of the valve 200 is fluidly coupled to the first chamber 116, the second port 214 is fluidly coupled to the directional control valve 102, and the pilot port 244 is coupled to the pilot line 126. As such, the valve 200 is configured to allow free flow from the second port 214 to the first port 212 to perform the operation of the free-flow check valve 132 described above with respect to FIG. 1.

Figure 5:
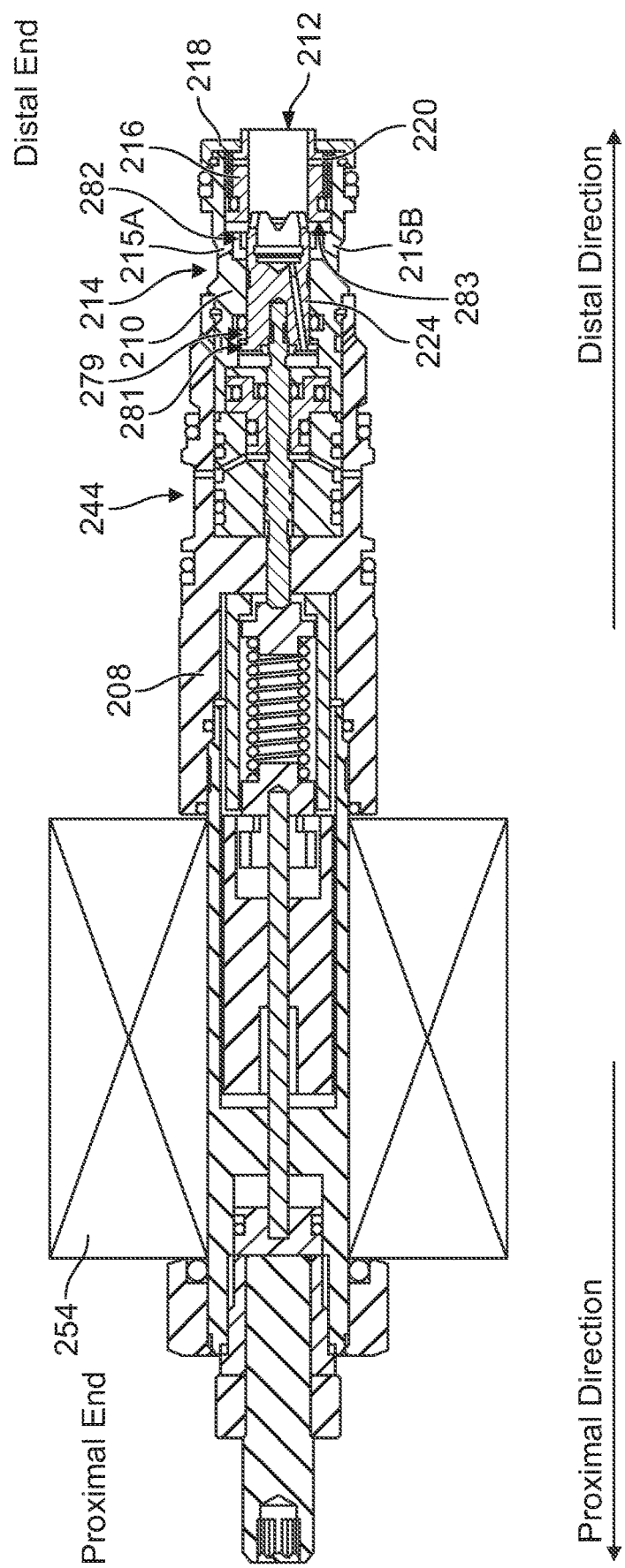
FIG. 5 illustrates operation of the valve of FIGS. 2-3 to allow free flow from a port to another port, in accordance with an example implementation.

FIG. 5 illustrates operation of the valve 200 to allow free flow from the second port 214 to the first port 212, in accordance with an example implementation. In this mode of operation, pressurized fluid is received at the second port 214 from the directional control valve 102, and the valve 200 allows fluid to flow freely from the second port 214 to the first port 212.

The pressurized fluid received at the second port 214 flows through the cross holes 215A, 215B to an annular space 282 between the interior peripheral surface of the main sleeve 210 and the exterior peripheral surface of the piston 224. The pressurized fluid then applies a force on a ring-shaped end face 283 of the reverse flow piston 216, thereby pushing the reverse flow piston 216 in the distal direction against the reverse flow check spring 220. FIG. 5 depicts the reverse flow piston 216 moved or displaced in the distal direction (to the right in FIG. 5) relative to its position in FIG. 2.

As a result of displacement of the reverse flow piston 216, the pressurized fluid received at the second port 214 flows freely (e.g., without sending a signal to the solenoid coil 254 and without a pilot pressure fluid signal to the pilot port 244) through the cross holes 215A, 215B, through a flow area formed between the piston 224 and the reverse flow piston 216, through an inner chamber or cavity of the reverse flow piston 216 to the first port 212. From the first port 212, the pressurized fluid flows to the first chamber 116.

As depicted in FIG. 5, a step or shoulder 279 is formed on the interior peripheral surface of the main sleeve 210. A step or shoulder 281 is formed on the exterior peripheral surface of the piston 224 at the proximal end thereof. The shoulder 281 of the piston 224 interacts with the shoulder 279 of the main sleeve 210 to prevent the piston 224 from following the reverse flow piston 216 when the reverse flow piston 216 moves in the distal direction.

As mentioned above with respect to FIG. 1, when the load 114 acts with gravity (e.g., overrunning load) the counterbalance valve 122 facilitates lowering the load 114 controllably by restricting flow of fluid forced out of the first chamber 116. Particularly, the counterbalance valve 122 receives a pilot pressure fluid signal from the pilot line 126 that acts along with the fluid received from the first chamber 116 to open the counterbalance valve 122. The counterbalance valve 122 prevents fluid flow from the first chamber 116 through the counterbalance valve 122 until the combined force of the pilot pressure fluid signal and the fluid from the first chamber 116 overcomes the biasing force of the setting spring 130. The amount of flow allowed through the counterbalance valve 122 is based on the pressure level of the pilot pressure fluid signal in the pilot line 126, such that a higher pilot pressure fluid signal causes the counterbalance valve 122 to allow a large amount of flow. This mode of operation can be referred to as the pilot modulation mode of operation.

The valve 200 is configured to operate in the pilot modulation mode of operation as well. Particularly, when a pilot pressure fluid signal received at the pilot port 244 along with the fluid received at the first port 212 act on the pilot pin 226 and overcome the pressure setting of the valve 200, the valve 200 opens and fluid is allowed from the first port 212 to the second port 214.

As mentioned above, pressurized fluid received at the first port 212 is communicated to the chamber 238 via the slanted channel 240. The pressurized fluid applies forces on external surfaces of the pilot pin 226. Further, the pilot pressure fluid signal received at the pilot port 244 is communicated to the gap 250 via the cross hole 246 and the channel 248 and applies respective forces on respective external surfaces of the pilot pin 226. The forces from both the pressurized fluid received at the first port 212 and the pilot pressure fluid signal act on the pilot pin 226 in the proximal direction (also referred to as the opening direction) due to the configuration of the pilot pin 226 as described next.

Figure 6:
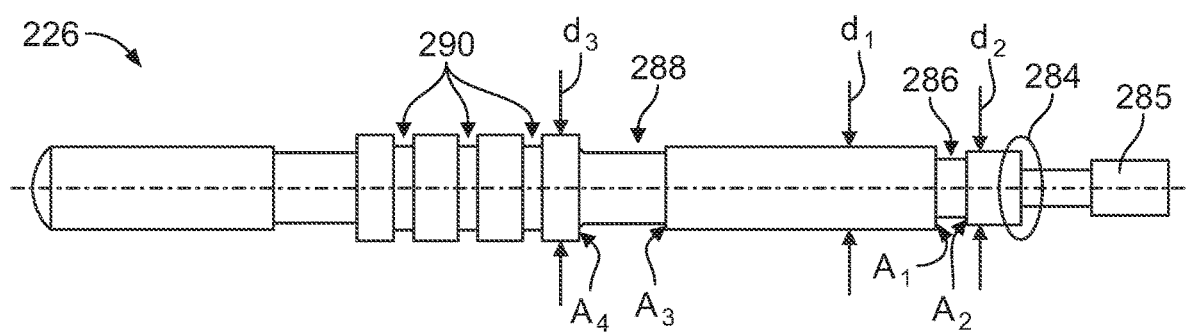
FIG. 6 illustrates a pilot pin, in accordance with an example implementation.

FIG. 6 illustrates the pilot pin 226, in accordance with an example implementation. As depicted in FIG. 6, the pilot pin 226 is configured to have a plurality of lands alternating with reduced diameter regions to form annular grooves on an exterior peripheral surface of the pilot pin 226. The pilot pin 226 has a seating edge 284 (circled in FIG. 6) that interfaces with the pilot seat 228 formed in the piston 224 when the valve 200 is in the closed position. The pilot pin 226 has a distal land 285 that is disposed within the cavity 225 of the piston 224. The space between the exterior peripheral surface of the distal land 285 and an interior peripheral surface of the cavity 225 is unsealed, and in examples a diameter of the distal land 285 may be slightly smaller than an interior diameter of the cavity 225 such that fluid is allowed to flow therebetween as described below.

The pilot pin further has a first annular groove 286, a second annular groove 288, and a plurality of balancing grooves 290. During operation of the valve 200, the balancing grooves 290 facilitate axial motion of the pilot pin 226 within the third spacer 234.

The first annular groove 286 is disposed in the chamber 238 when the valve 200 is in the closed position shown in FIG. 2. As such, the pressurized fluid received at the first port 212 and communicated to the chamber 238 via the slanted channel 240 (see FIG. 2) is provided to the first annular groove 286.

The first annular groove 286 is bounded by a first annular surface area "$A_1$" and a second annular surface area "$A_2$" labelled in FIG. 6. The annular surface areas "$A_1$" and "$A_2$" are ring-shaped. The pressurized fluid provided to the first annular groove 286 applies respective forces in opposite directions on the annular surfaces areas "$A_1$" and "$A_2$." The annular surface area "$A_1$" is slightly larger than the annular surface area "$A_2$." Specifically, the difference $A_1$ minus $A_2$ can be determined as $$\frac{\pi}{4}(d_1^2 - d_2^2),$$

where "$d_1$" and "$d_2$" are labelled in FIG. 6. The difference $A_1$ minus $A_2$ can be referred to as effective or differential relief area $A_{DR}$. The pressure setting of the valve 200 can be determined by dividing the biasing force that the solenoid spring 262 applies to the pilot pin 226 (via the distal spring cap 264) by the differential relief area $A_{DR}$.

As a result, the pressurized fluid in the chamber 238 applies a net force on the pilot pin 226 in the proximal direction (e.g., to the left in FIGS. 2 and 6). The net force can be determined, for example, by multiplying a pressure level of the pressurized fluid by the area difference $A_1$ minus $A_2$.

This net force might not be sufficiently large to overcome the pressure setting of the valve 200 (e.g., overcome the force of the solenoid spring 262 on the pilot pin 226 via the distal spring cap 264). This net force is, however, supplemented by a force applied to the pilot pin 226 by the pilot pressure fluid signal received at the pilot port 244.

The pilot pressure fluid signal received at the pilot port 244 and communicated to the gap 250 via the cross hole 246 and the channel 248 is provided to the second annular groove 288 of the pilot pin 226. The second annular groove 288 is bounded by a third annular surface area "$A_3$" and a fourth annular surface area "$A_4$" labelled in FIG. 6. The annular surface areas "$A_3$" and "$A_4$" are ring-shaped. The pilot pressure fluid signal communicated to the second annular groove 288 applies respective forces in opposite directions on the annular surfaces areas "$A_3$" and "$A_4$." The annular surface area "$A_4$" is slightly larger than the annular surface area "$A_3$." Specifically, the difference $A_4$ minus $A_3$ can be determined as $$\frac{\pi}{4}(d_3^2 - d_1^2),$$

where "$d_3$" and "$d_1$" are labelled in FIG. 6. The difference $A_4$ minus $A_3$ can be referred to as effective or differential pilot area $A_{DP}$.

As a result, the pilot pressure fluid signal applies a net force on the pilot pin 226 in the proximal direction (e.g., to the left in FIGS. 2 and 6). The net force can be determined, for example, by multiplying a pressure level of the pilot pressure fluid signal by the differential area $A_{DP}$.

As such, several forces are applied to the pilot pin 226. The solenoid spring 262 applies a first force on the pilot pin 226 via the distal spring cap 264 in the distal direction. The pressurized fluid at the first port 212 applies a second force on the pilot pin 226 in the proximal direction, and the pilot pressure fluid signal applies a third force on the pilot pin 226 also in the proximal direction. When the pressure levels of the pressurized fluid at the first port 212 and the pilot pressure fluid signal are sufficiently high to cause the second and third forces acting in the proximal direction to overcome the first force of the solenoid spring 262 acting in the distal direction, the pilot pin 226 is pushed or displaced axially in the proximal direction. As such, the pilot pin 226 is unseated off the pilot seat 228 formed in the piston 224.

The pilot pin 226 thus moves axially in the proximal direction relative to the piston 224 and the spacers 231, 232, and 234, thereby pushing the distal spring cap 264 in the proximal direction and compressing the solenoid spring 262. As a result of compression of the solenoid spring 262, the first force that it applies on the pilot pin 226 in the distal direction increases. Thus, the pilot pin 226 may move axially in the proximal direction until force equilibrium between the second and third forces and the increased first force is reached.

Figure 7:
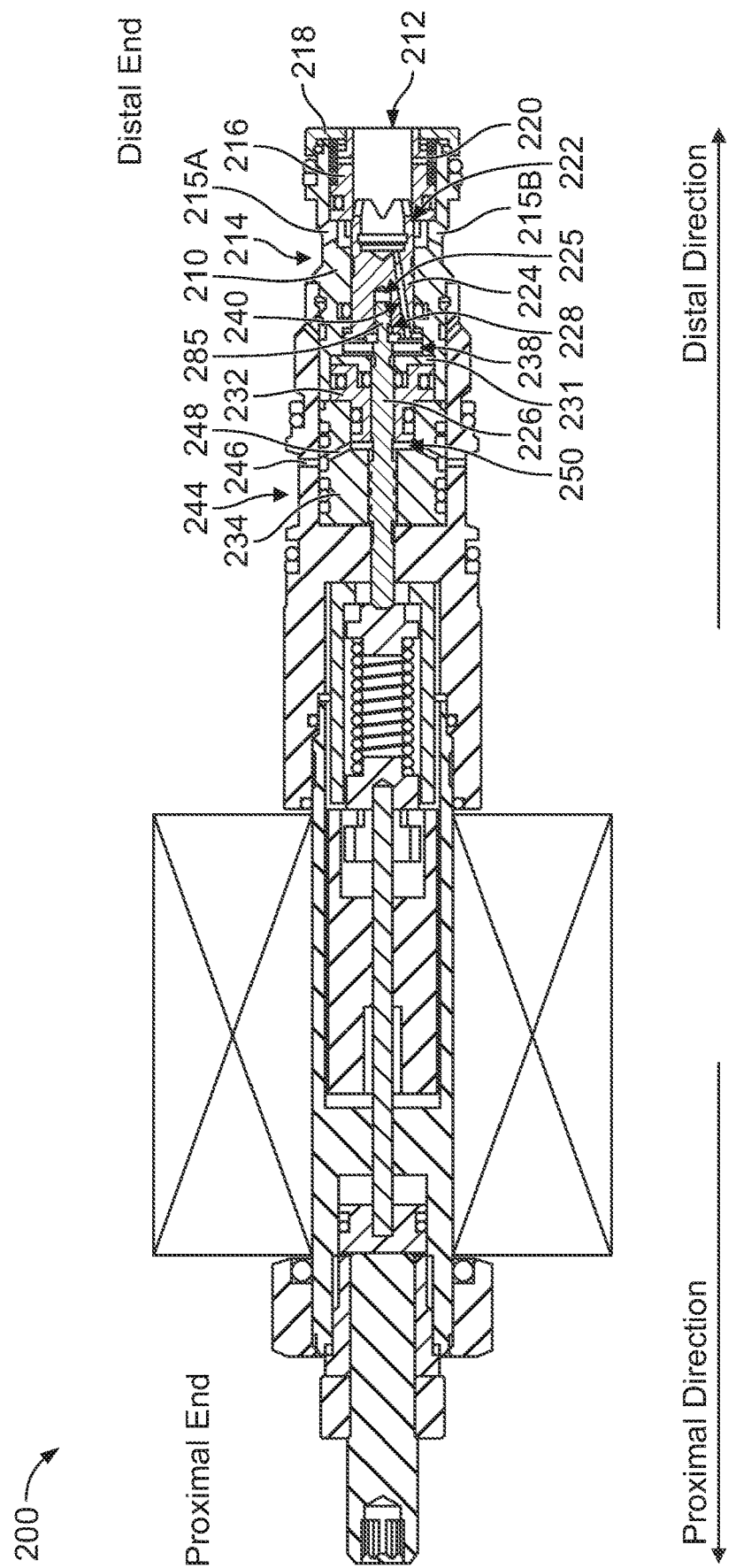
FIG. 7 illustrates a cross-sectional side view of the valve of FIG. 2 with a pilot pin displaced axially relative to a piston, in accordance with an example implementation.
Figure 8:
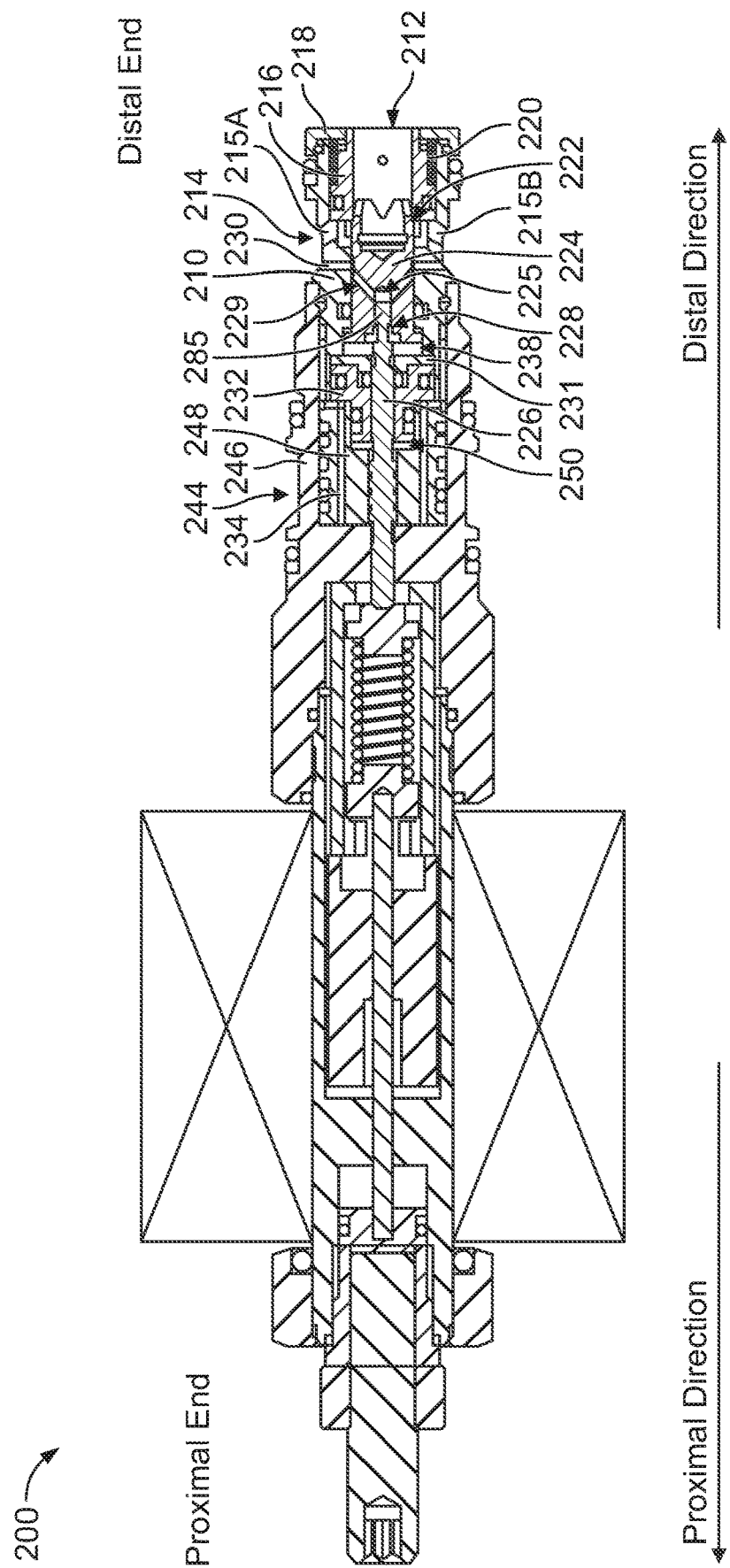
FIG. 8 illustrates a cross-sectional bottom view of the valve of FIG. 2 with a pilot pin displaced axially relative to a piston, in accordance with an example implementation.

FIG. 7 illustrates a cross-sectional side view of the valve 200 with the pilot pin 226 displaced axially relative to the piston 224, and FIG. 8 illustrates a cross-sectional bottom view of the valve 200 with the pilot pin 226 displaced axially relative to the piston 224, in accordance with an example implementation. With the pilot pin 226 unseated off the pilot seat 228, fluid is allowed to flow from the first port 212 through the slanted channel 240 to the chamber 238, then around the distal land 285 of the pilot pin 226 to the cavity 225 within the piston 224.

Referring to FIG. 8, the fluid in the cavity 225 within the piston 224 is allowed to flow through the slanted channel 229 formed in the piston 224 and through cross holes disposed in the main sleeve 210 such as the cross hole 230 to the second port 214. The fluid flow from the first port 212 through the slanted channel 229 to the second port 214 can be referred to as the pilot flow.

Referring back to FIG. 7, the pilot flow from the first port 212 to the second port 214 allows for a pressure drop across the slanted channel 240 which operates as a restriction. Thus, the pressure level of fluid in the chamber 238 becomes lower than the pressure level of fluid received at the first port 212. As a result, the fluid at the first port 212 applies a force on the piston 224 in the proximal direction that is larger than the force applied by fluid in the chamber 238 on the piston 224 in the distal direction. Due to such force imbalance on the piston 224, the piston 224 moves or is displaced axially in the proximal direction.

Figure 9A:
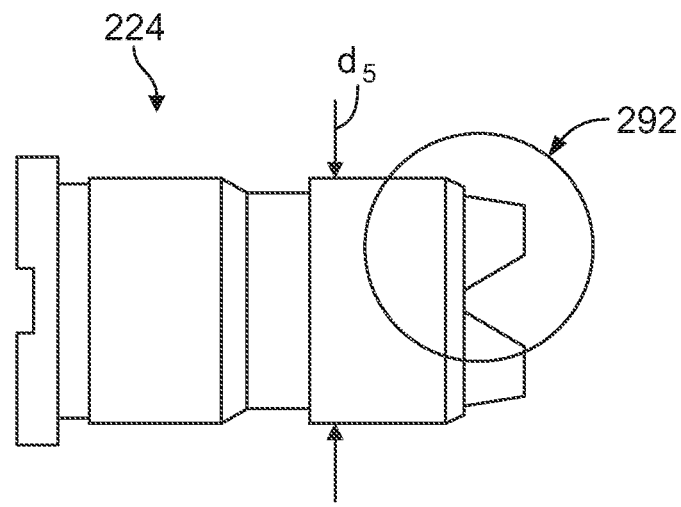
FIG. 9A illustrates a piston, in accordance with an example implementation.
Figure 9B:
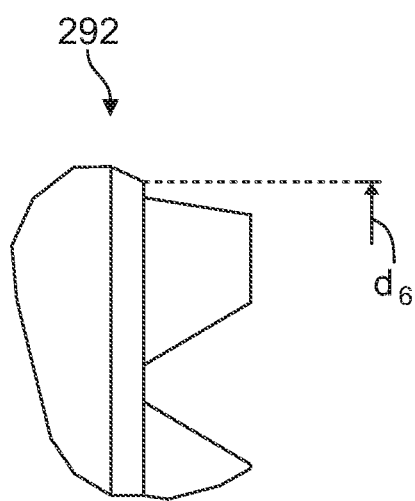
FIG. 9B illustrates a zoomed-in view of a portion circled in FIG. 9A, in accordance with an example implementation.

FIG. 9A illustrates the piston 224, and FIG. 9B illustrates a zoomed-in view of a portion 292 circled in FIG. 9A, in accordance with an example implementation. The pressurized fluid in the chamber 238 acts on a differential surface area $A_5$ equal to area having diameter "$d_5$" labelled in FIG. 9A minus cross-sectional area of the pilot pin 226 at the pilot seat 228. Pressurized fluid at the first port 212 acts on a surface area $A_6$ at a distal face of the piston 224, which is a circular area having diameter "$d_6$" labelled in FIG. 9B. Thus, assuming that pressure level in the chamber 238 is $P_5$ and pressure level at the first port 212 is $P_6$, then a net force F acting on the piston 224 can be estimate by the following equation:

$$F = P_5 A_5 - P_6 A_6 \quad (1)$$

The piston 224 is configured such that $A_5$ is greater than or equal to $A_6$. As such, the piston 224 is pressure-biased in the distal direction to be seated at the piston seat 222 when the pilot pin 226 is seated at the pilot seat 228 and there is no pilot flow (e.g., when the valve 200 is in the closed state). Particularly, when no pilot flow occurs, the pressure level in the chamber 238 is equal to the pressure level at the first port 212. Because $A_5$ is greater than or equal to $A_6$, the net force F is greater than or equal to zero, and the piston 224 is biased toward the piston seat 222. As an example for illustration, assuming $A_5$ (area having diameter $d_5$ minus cross-sectional area of the pilot pin 226 at the pilot seat 228) is equal to 0.065 square inches. Further, assuming that $A_6$ is 0.061 square inches, and assuming $P_5 = P_6 = 5000$ pounds per square inches (psi), then using equation (1), F is equal to 20 pound-force (lbf) and acts in the distal direction.

When pilot flow occurs as the pilot pin 226 is unseated, the pressure $P_5$ in the chamber 238 decreases. When $P_5$ decreases to a value less than $$\frac{P_6 A_6}{A_5},$$

then the net force F turns negative, and acts in the proximal direction, causing the piston 224 to be unseated off the piston seat 222 and be displaced axially. For example, if $A_5$ is equal to 0.065 square inches, $A_6$ is 0.061 square inches, and $P_6 = 5000$ psi, then if $P_5$ drops as a result of the pilot flow to a value less than 4692.3 psi, then the piston 224 is displaced axially in the proximal direction. These numbers are examples for illustration only, and are not meant to be limiting. The valve 200 could operate with other area and pressure level values.

Figure 9C:
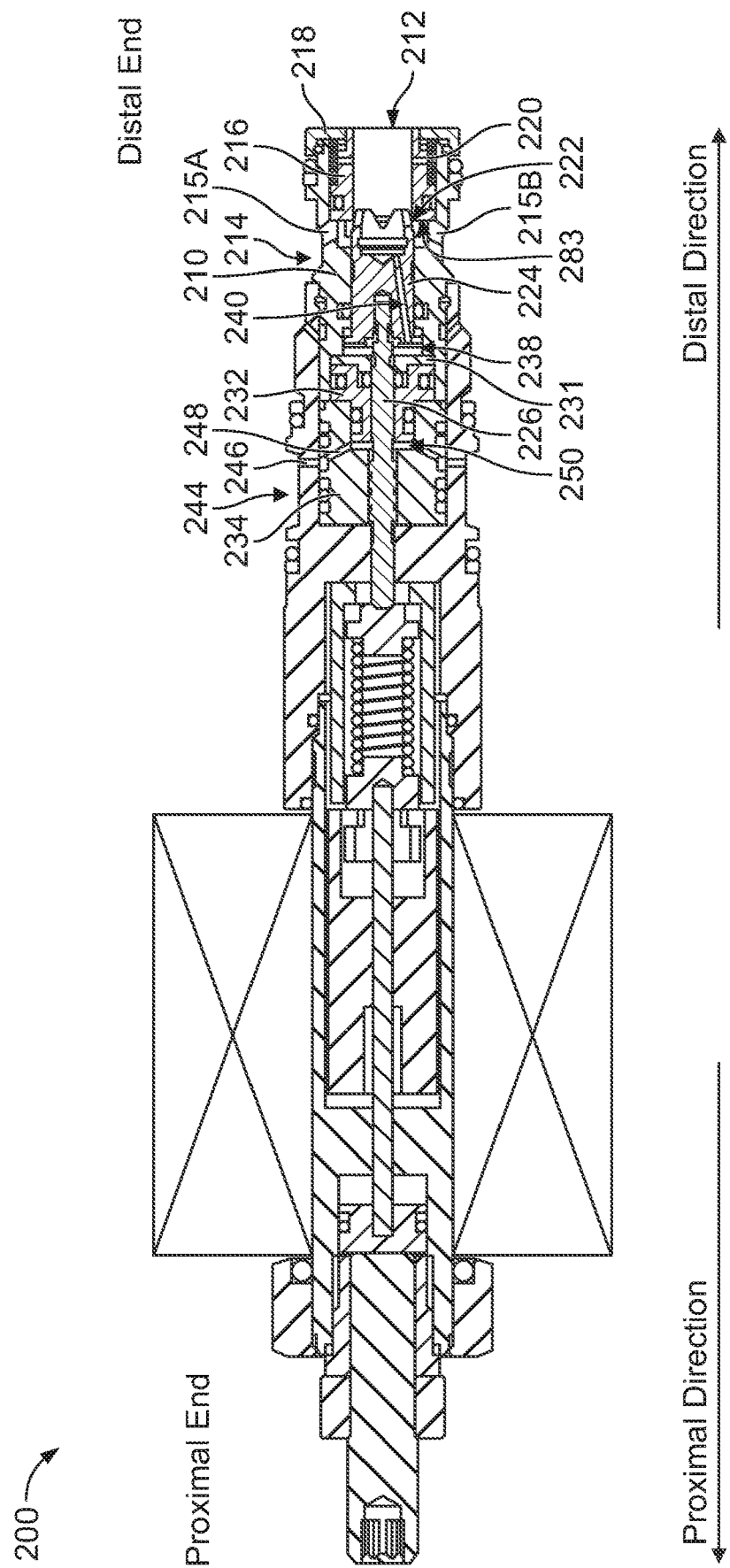
FIG. 9C illustrates a piston displaced and the valve of FIG. 2 in an open state, in accordance with an example implementation.

FIG. 9C illustrates the piston 224 displaced and the valve 200 in an open state, in accordance with an example implementation. As depicted in FIG. 9C, a net force acting on the piston 224 in the proximal direction causes the piston 224 to be unseated off the piston seat 222 and follow the pilot pin 226. As a result, fluid received at the first port 212 is allowed to flow through the inner chamber of the reverse flow piston 216, through a flow area formed between the reverse flow piston 216 and the piston 224, through the cross holes 215A, 215B directly to the second port 214, rendering the valve in an open state. The direct flow from the first port 212 to the second port 214 can be referred to as the main flow.

As the pilot pin 226 and the piston 224 move in the proximal direction, the distal spring cap 264 also moves in the proximal direction relative to the protrusion 268 of the solenoid sleeve 266. The extent of motion is shown by comparing the position of the flanged portion 270 of the distal spring cap 264 relative to the protrusion 268 in FIG. 9C with the position of the flanged portion 270 relative to the protrusion 268 in FIG. 2.

As shown in FIG. 9C, the ring-shaped end face 283 of the reverse flow piston 216 interacts with a shoulder formed in the main sleeve 210 to prevent the reverse flow piston 216 from following the piston 224 when the piston 224 moves in the proximal direction.

The configuration of the valve 200 renders the valve 200 more stable than other valve configurations. As mentioned above, one of the factors that affect stability of a counterbalance valve is the pilot ratio. The pilot ratio determines how the pressure setting of the valve 200 changes as the pilot pressure (i.e., the pressure level of the pilot pressure fluid signal at the pilot port 244) changes. As an example, a 3:1 pilot ratio indicates that an increase of, for example, 10 bar in the pilot pressure decreases the pressure setting by 30 bar.

With the configuration of the valve 200, the pilot ratio is determined based on the areas labelled "$A_1$," "$A_2$," "$A_3$," and "$A_4$" in FIG. 6. Specifically, the pilot ratio $P_R$ of the valve 200 can be estimate by the following equation:

$$P_R = \frac{A_{DP}}{A_{DR}} = \frac{A_4 - A_3}{A_1 - A_2} \quad (2)$$

The pilot pin 226 can be configured such that the areas "$A_1$," "$A_2$," "$A_3$," and "$A_4$" achieve a particular $P_R$ that enhances stability of the valve 200. Notably, the pilot ratio $P_R$ is independent of the effective area of the pilot seat 228 (e.g., the circular area having a diameter of the pilot seat 228 determined by the piston 224). Thus, the pilot ratio is determined entirely with the configuration of the pilot pin 226, rather than both the pilot pin 226 and the piston 224.

Further, the pilot pressure fluid signal received at the pilot port 244 applies a force on the pilot pin 226, which is independent and decoupled from the piston 224. Thus, the pilot pressure fluid signal at the pilot port 244 acts on a movable element (the pilot pin 226) different from the main movable element (the piston 224). In other words, the pilot pressure fluid signal does not act or apply a force on the main movable element (the piston 224) that restricts or blocks main flow path from the first port 212 to the second port 214. This configuration may enhance stability of the valve 200 relative to other counterbalance valves.

Further, the piston 224 is not supported or acted upon by a spring like conventional counterbalance valves where the main movable element is acted upon directly by a spring.

The lack of a spring acting directly on the piston 224 reduces the likelihood of oscillations of the piston 224 and renders the valve 200 more stable.

Referring back to FIG. 2, beneficially, the valve 200 is characterized in that the pressure setting of the valve 200 can be adjusted based on a signal provided to the solenoid coil 254. When an electric current is provided through the windings of the solenoid coil 254, a magnetic field is generated. The pole piece 274 directs the magnetic field through the airgap 276 toward the armature 256, which is movable and is attracted toward the pole piece 274. As such, a solenoid force is applied on the armature 256, where the solenoid force is a pulling force that tends to pull the armature 256 in the proximal direction.

The solenoid force applied to the armature 256 is also applied to the solenoid sleeve 266 coupled thereto. As such, the solenoid sleeve 266 applies a force on the distal spring cap 264 in the proximal direction due to the interaction between the protrusion 268 and the flanged portion 270. The distal spring cap 264 in turn applies a compressive force in the proximal direction on the solenoid spring 262. As a result, the biasing force that the solenoid spring 262 applies to the pilot pin 226 in the distal direction is reduced, and the pressure setting of the valve 200 is also reduced. This reduction in the pressure setting when the solenoid coil 254 is energized can take place whether the valve 200 is open or closed and whether the armature 256 moves or not.

Under some operating conditions, load pressure at the first port 212 and forces acting on the pilot pin 226 allow the distal spring cap 264 to move. Under these operating conditions, when the solenoid coil 254 is energized, and because the pole piece 274 is fixed and the armature 256 is movable, the armature 256 is pulled in the proximal direction and traverses the airgap 276 toward the pole piece 274. The armature 256 moves while the solenoid pin 258 does not move therewith. As the armature 256 is pulled in the proximal direction, the armature 256 causes the solenoid sleeve 266 coupled thereto to move in the proximal direction as well. As the solenoid sleeve 266 moves in the proximal direction, the protrusion 268, which interfaces and interacts with the flanged portion 270, causes the distal spring cap 264 to also move in the proximal direction. The proximal spring cap 260, however, remains stationary as it is coupled to the solenoid pin 258, which does not move with the armature 256.

As a result of motion of the distal spring cap 264 in the proximal direction, the biasing force that the solenoid spring 262 applies to the pilot pin 226 in the distal direction is reduced. For example, the biasing force acting on the pilot pin 226 can be determined as the spring force of the solenoid spring 262 minus the solenoid force applied by the armature 256 on the solenoid sleeve 266 in the proximal direction. As a result of the reduction in the force applied to the pilot pin 226, the pressure setting of the valve 200 is reduced. Thus, the force that the pressurized fluid received at the first port 212 and the pilot pressure fluid signal received the pilot port 244 need to apply on the pilot pin 226 to open the valve 200 is reduced.

When the valve 200 is closed or the operating conditions (load pressure at the first port 212 and forces acting on the pilot pin 226) do not allow the distal spring cap 264 to move, pressure setting of the valve 200 is determined strictly by a static force balance between forces acting on the pilot pin 226. Even under static conditions, the solenoid force applied to the armature 256 is transferred to solenoid spring 262 via the solenoid sleeve 266 and the distal spring cap 264. As a result of the force applied on the solenoid spring 262 in the proximal direction, a reduction in the pressure setting of the valve 200 takes place despite absence of motion of the armature 256, the solenoid sleeve 266, or the distal spring cap 264.

With this configuration, the pulling force of the armature 256 in the proximal direction and the force that the pilot pressure fluid signal applies to the pilot pin 226 assist the pressurized fluid received at the first port 212 in overcoming the force applied to the pilot pin 226 in the distal direction by the solenoid spring 262. In other words, the force that the pressurized fluid received at the first port 212 needs to apply to the pilot pin 226 to cause it to move axially in the proximal direction is reduced to a predetermined force value that is based on: (i) the pressure level of the pilot pressure fluid signal, and (ii) the solenoid force that is based on the magnitude of the electric current (e.g., magnitude of the signal) provided to the solenoid coil 254. As such, the pulling force (i.e., the solenoid force) resulting from sending a signal to the solenoid coil 254 and the force resulting from the pilot pressure fluid signal received at the pilot port 244 effectively reduce the pressure setting of the valve 200, and thus a reduced pressure level at the first port 212 can cause the valve 200 to open.

The valve 200 could operate in other modes of operation as well. For instance, in addition to being configured as a counterbalance valve, the valve 200 could be configured as a pressure relief valve.

Figure 10:
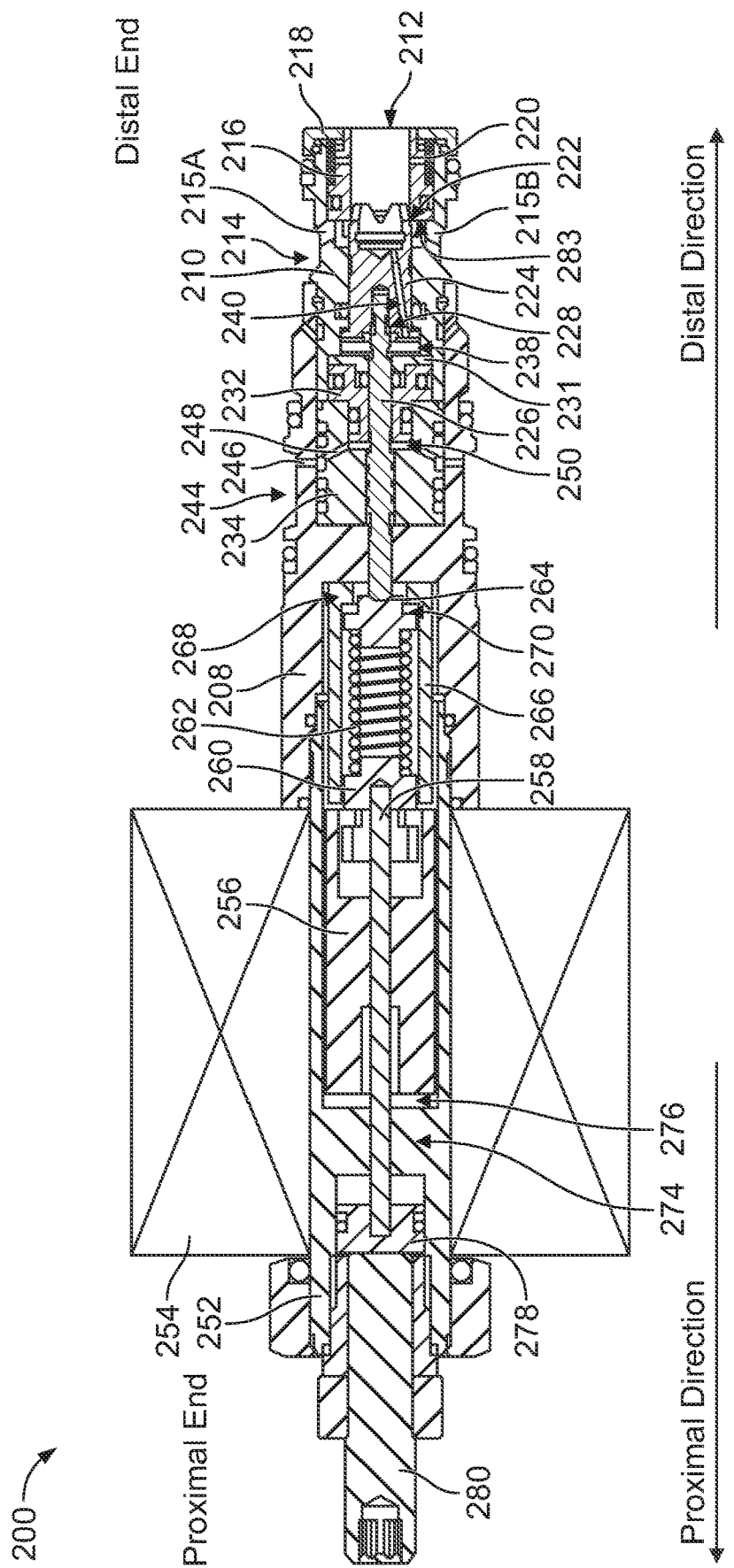
FIG. 10 illustrates a cross-sectional side view of the valve of FIG. 2 in a pressure relief mode, in accordance with an example implementation.

FIG. 10 illustrates a cross-sectional side view of the valve 200 in a pressure relief mode, in accordance with an example implementation. In the pressure relief mode, the valve 200 could be used to control or limit pressure level in a hydraulic system. The valve 200 is configured to open when pressure level of fluid received at the first port 212 and communicated to the chamber 238 reaches a predetermined set pressure determined by the solenoid spring 262. The predetermined set pressure is determined by dividing a preload force that the solenoid spring 262 applies to the pilot pin 226 (via the distal spring cap 264) by the differential relief area $A_{DR}$ defined above with respect to FIG. 6.

As mentioned above with respect to FIG. 6, the first annular groove 286 of the pilot pin 226 is disposed in the chamber 238 when the valve 200 is in the closed position shown in FIG. 2. As such, the pressurized fluid in the chamber 238 is communicated to the first annular groove 286 of the pilot pin 226 and applies a net force in the proximal direction on the pilot pin 226 due to the area difference between "$A_1$" and "$A_2$." Once the net force applied on the pilot pin 226 in the proximal direction by the pressurized fluid in the chamber 238 exceeds the force applied by the solenoid spring 262 on the pilot pin 226 in the distal direction, the pilot pin 226 moves axially in the proximal direction off the pilot seat 228.

As a result of the pilot pin 226 being unseated, a pilot flow is generated from the first port 212 through slanted channel 240 to the chamber 238, then around the pilot pin 226 to the cavity 225 within the piston 224, then through the slanted channel 229 and the cross hole 230 (see FIG. 8) to the second port 214. The pilot flow from the first port 212 to the second port 214 allows for a pressure drop across the slanted channel 240 which operates as a restriction. Thus, the pressure level of fluid in the chamber 238 becomes lower that the pressure level of fluid received at the first port 212. As a result, the fluid at the first port 212 applies a force on the piston 224 in the proximal direction that is large than the force applied by fluid in the chamber 238 on the piston 224 in the distal direction. Due to such force imbalance on the piston 224, the piston 224 moves or is displaced axially in the proximal direction and follows the pilot pin 226. As such, pressurized fluid at the first port 212 is relieved to the second port 214.

As shown in FIG. 10, the piston 224 and pilot pin 226 are displaced in the proximal direction. In the pressure relief mode, the pressure level at the first port 212 that causes the valve 200 to open is higher than the pressure level that opens the valve 200 in the pilot modulation mode. That is because in the pressure relief mode, no pilot pressure fluid signal is received at the pilot port 244 to assist the fluid received at the first port 212 in pushing the pilot pin 226 in the proximal direction. Also, as a result of the absence of a pilot pressure fluid signal, the distance that the piston 224 moves in the proximal direction in the pressure relief mode is smaller than the distance that it moves in the pilot modulation mode. This is evident by comparing, for example, an axial distance between the flanged portion 270 and the protrusion 268 in FIG. 10, to the distance between the flanged portion 270 and the protrusion 268 in FIGS. 7-9.

Beneficially, the predetermined set pressure of the valve 200 operating in the pressure relief mode can be adjusted by sending a signal to the solenoid coil 254. As described above, providing an electric current to the solenoid coil 254 by an electronic controller of a hydraulic system results in the armature 256 applying a force to the solenoid spring 262 in the proximal direction via the solenoid sleeve 266, thereby reducing the preload force that the solenoid spring 262 applies to the pilot pin 226. Thus, the pressure setting can be adjusted by varying the electric current to the solenoid coil 254 to allow different levels of pressures at the first port 212 as desired to overcome the preload force of the solenoid spring 262 and open the valve 200.

The configurations and components shown in FIGS. 2-10 are examples for illustration, and different configurations and components could be used. For example, components can be integrated into a single component or a component can be divided into multiple components. As another example, different types of springs could be used, and other components could be replaced by components that perform a similar functionality.

Figure 11:
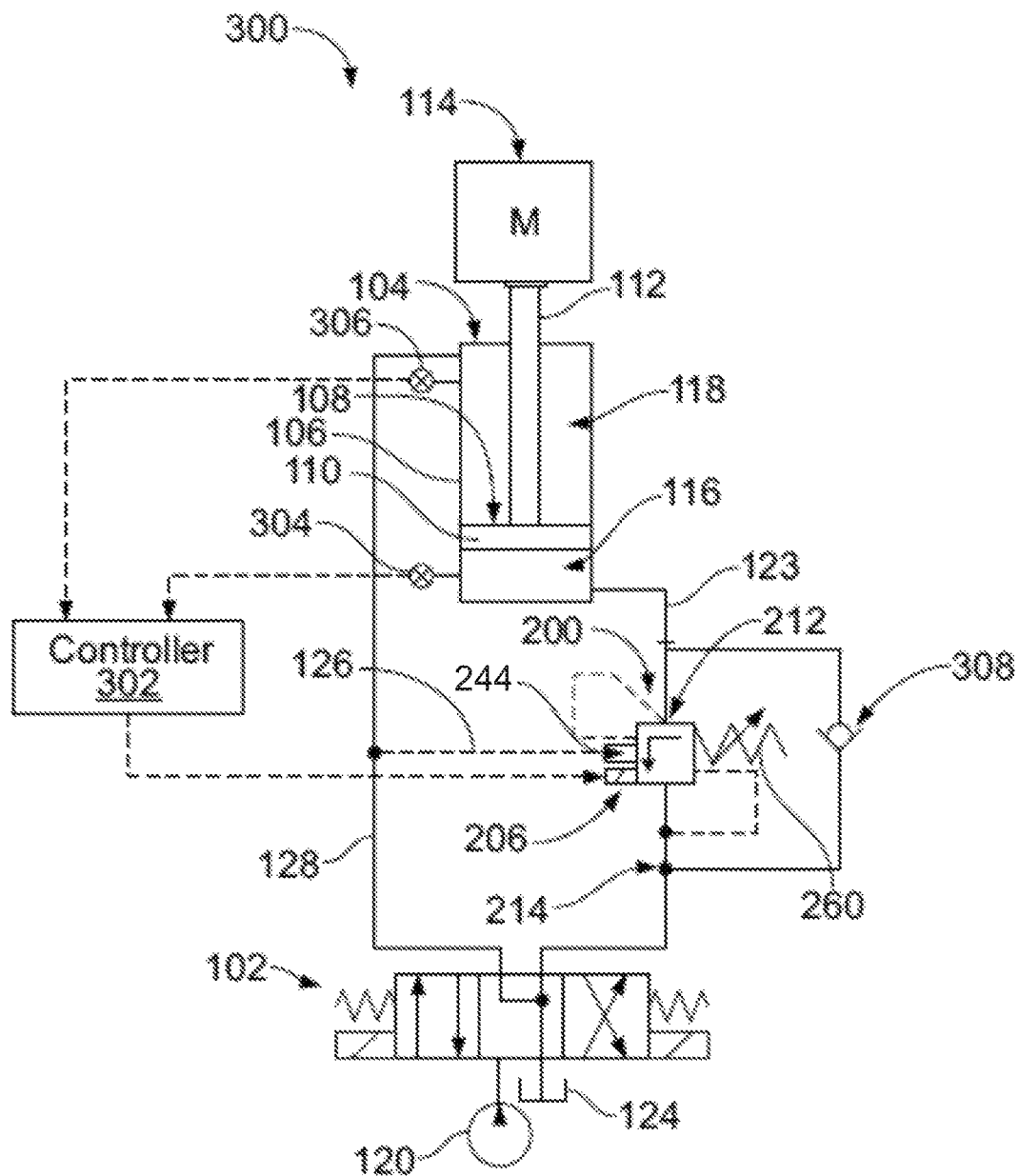
FIG. 11 illustrates a hydraulic circuit using the valve of FIG. 2, in accordance with an example implementation.

FIG. 11 illustrates a hydraulic circuit 300 using the valve 200, in accordance with an example implementation. Similar components between the hydraulic circuit 300 and the hydraulic circuit 100 are designated with the same reference numbers. As shown in FIG. 11, the valve 200 replaces the counterbalance valve 122. The first port 212 of the valve 200 is fluidly coupled to the first chamber 116 and the second port 214 is fluidly coupled to the directional control valve 102. The pilot port 244 is fluidly coupled via the pilot line 126 to the hydraulic line 128 that fluidly couples the directional control valve 102 to the second chamber 118.

The hydraulic circuit 300 includes a controller 302 that could comprise any type of computing device configured to control operation of the hydraulic circuit 300 or a hydraulic system that includes the hydraulic circuit 300. The controller 302 may include one or more processors or microprocessors and may include data storage (e.g., memory, transitory computer-readable medium, non-transitory computer-readable medium, etc.). The data storage may have stored thereon instructions that, when executed by the one or more processors of the controller 302, cause the controller 302 to perform the operations described herein.

The hydraulic circuit 300 may include one or more pressure sensors such as pressure sensor 304 configured to measure pressure level in the first chamber 116 and pressure sensor 306 configured to measure pressure level in the second chamber 118. The pressure sensors 304, 306 are in communication with the controller 302 and provide to the controller 302 information indicative of the pressure levels respectively measured by the pressure sensors 304, 306. The controller 302 may then determine the load 114 based on the pressure levels in the chambers 116, 118 and the surface areas of the piston 108 in each chamber.

The hydraulic circuit 300 may additionally or alternatively include a load sensor configured to measure the load 114. Further, in some examples, the hydraulic circuit 300 may include one of the pressure sensors 304, 306, such as the pressure sensor 304 configured to measure the pressure level in the first chamber 116. Other types of sensors could be used to indicate the magnitude of the load 114.

In operation, to extend the piston 108, pressurized fluid is provided from the pump 120 through the directional control valve 102 and the free flow check 308 to the first chamber 116. The free flow check 308 is a symbolic representation of the reverse free flow operation described above with respect to FIG. 5. Particularly, the reverse flow piston 216 moves distally allowing flow from the second port 214 through the cross holes 215A, 215B and the internal chamber of the reverse flow piston 216 to the first port 212, which is coupled to the first chamber 116. As the piston 108 extends, fluid forced out of the second chamber 118 flows through the hydraulic line 128 and the directional control valve 102 to the tank 124.

To retract the piston 108, pressurized fluid is provided from the pump 120 through the directional control valve 102 and the hydraulic line 128 to the second chamber 118. As the piston 108 retracts, fluid in the first chamber 116 is forced out of the first chamber 116 through the hydraulic line 123 to the first port 212. Further, a pilot pressure fluid signal is received through the pilot line 126 at the pilot port 244.

The pilot pressure fluid signal received through the pilot line 126 at the pilot port 244 acts on the pilot pin 226 as described above with respect to FIGS. 6-9. The pilot pressure fluid signal, along with the fluid received at the first port 212 act against the solenoid spring 262. Once the combined action of the pilot pressure fluid signal and the fluid at the first port 212 overcome the pressure setting of the valve 200, the valve 200 may open to allow fluid at the first port 212 to flow to the second port 214, then through the directional control valve 102 to the tank 124.

Additionally, the controller 302 may vary, adjust, or modify the pressure setting of the valve 200 by providing a signal to the solenoid actuation mechanism 206 (particularly, to the solenoid coil 254) of the valve 200. As described above, providing an electric signal to the solenoid coil 254 causes the armature 256 and the solenoid sleeve 266 coupled thereto to apply a force to the solenoid spring 262 in the proximal direction, thereby reducing the pressure setting of the valve 200.

In this manner, the controller 302 may monitor the load 114 through the information received from the pressure sensors 304, 306 or any other sensors to determine whether the load 114 is acting with gravity and inducing a large pressure in the first chamber 116 and the extent or value of the induced pressure in the first chamber 116. Accordingly, the controller 302 may send a signal to the solenoid coil 254 to vary the pressure setting of the valve 200.

In examples, the magnitude of the pressure setting may be inversely proportional to the magnitude of the electric signal provided to the solenoid coil 254. As such, if the load 114 is large and acting with gravity, then the controller 302 might not send a signal to the solenoid coil 254 or might send a signal with a small magnitude so as to maintain the pressure setting high and control lowering the load 114. On the other hand, if the load 114 is small or the actuator 104 is tilted at an angle such that gravitational force is reduced, the controller 302 may provide an electric signal with a larger magnitude to reduce the pressure setting of the valve 200. This way, the pressure level in the first chamber 116 that causes the valve 200 to open may be reduced. As a result, the hydraulic circuit 300 operates more efficiently and energy loss is reduced.

The hydraulic circuit 300 is an example circuit in which the valve 200 could be used; however, the valve 200 could be used in other hydraulic circuits and systems as well. For instance, rather than using a four-way direction control valve that controls flow to both chambers 116, 118, a separate two or three way valve could be used to independently meter fluid into each of the chambers 116, 118. In this case, two valves 200 could be used, one valve 200 for each chamber to control flow forced out of each chamber.

Further, in some examples, rather than having fluid exiting the valve 200 at the second port 214 flowing through the directional control valve 102 before being delivered to the tank 124, the valve 200 can be configured as a meter-out element while a two- or three-way directional control valve is configured as a meter-in element. In this configuration, the second port 214 could be fluidly coupled to the tank 124 such that fluid exiting the valve 200 flows to the tank 124 without flowing through a directional control valve.

In some examples, the directional control valves could be electrically operated as well, and in these examples, the controller 302 may be configured to send signals to the directional control valves to actuate them based on the sensor information received from the pressure sensors 304, 306. Other configurations are possible.

Figure 12:
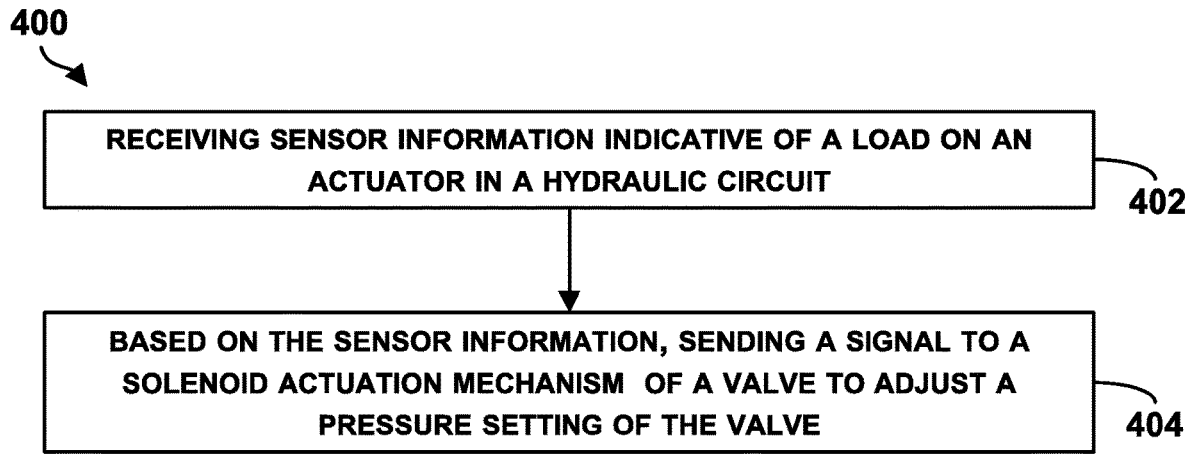
FIG. 12 illustrates is a flowchart of a method for controlling a hydraulic circuit, in accordance with an example implementation.

FIG. 12 is a flowchart of a method 400 for controlling a hydraulic circuit, in accordance with an example implementation. The method 400 could, for example, be performed by a controller such as the controller 302.

The method 400 may include one or more operations, or actions as illustrated by one or more of blocks 402-404. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

In addition, for the method 400 and other processes and operations disclosed herein, the flowchart shows operation of one possible implementation of present examples. In this regard, each block may represent a module, a segment, or a portion of program code, which includes one or more instructions executable by a processor or a controller for implementing specific logical operations or steps in the process. The program code may be stored on any type of computer readable medium or memory, for example, such as a storage device including a disk or hard drive. The computer readable medium may include a non-transitory computer readable medium or memory, for example, such as computer-readable media that stores data for short periods of time like register memory, processor cache and Random Access Memory (RAM). The computer readable medium may also include non-transitory media or memory, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, a tangible storage device, or other article of manufacture, for example. In addition, for the method 400 and other processes and operations disclosed herein, one or more blocks in FIG. 10 may represent circuitry or digital logic that is arranged to perform the specific logical operations in the process.

At block 402, the method 400 includes receiving sensor information indicative of a load on an actuator in a hydraulic circuit. As mentioned above, a hydraulic circuit such as the hydraulic circuit 300 could include one or more pressure sensors 304, 306 coupled to respective chambers of a hydraulic actuator. The controller 302 may receive information from the pressure sensors 304, 306 and may accordingly determine a magnitude the load 114 that the actuator 104 is subjected to. Additionally or alternatively, the hydraulic circuit may include a load cell that may provide to the controller 302 information indicative of the magnitude of the load 114. Other parameters or variables can be used to indicate the magnitude of the load 114. For instance, variation in pressure level of the pilot pressure fluid signal could be used. Also, parameters of a machine including parameters associated with the actuator 104 could be used, such as position or speed of the piston 108 indicated by a position or velocity sensor. As another example for illustration, if the actuator 104 drives a drill of a vertical drilling machine, for instance, a length of the drill could be used to indicate a weight that the drill is subjected to. As another example, wind speed could be used to indicate a particular type of load on an actuator. Other example parameters could be used based on the type of application.

At block 404, the method 400 includes, based on the sensor information, sending a signal to the solenoid actuation mechanism 206 of the valve 200 to adjust the pressure setting of the valve 200. As described above, the controller 302 may provide a signal to the solenoid coil 254 to cause the armature 256 to apply a force on the solenoid spring 262 and accordingly adjust the pressure setting of the valve 200.

For example, in an overrunning load case where the piston 108 retracts the load 114 that is a large negative load acting with gravity assistance, a large induced pressure in the first chamber 116 and a low pressure in the second chamber 118 result. Accordingly, the controller 302 might not send a signal to the solenoid coil 254 or may send a signal with a small magnitude so as to have a high pressure setting for the valve 200 and lower the load 114 controllably. As the hydraulic circuit operates and the actuator 104 moves, the load 114 may change (e.g., the angle of the actuator 104 relative to the ground surface may change). For instance, the load 114 may be begin to decrease or change to a positive load where pressurized fluid in communicated to the second chamber 118 to cause the piston 108 to retract and pull the load 114. In this case, pressure level in the first chamber 116 may be reduced and the pilot pressure fluid signal may have a high pressure level. Accordingly, the controller 302 may send a signal to the solenoid coil 254 to decrease the pressure setting of the valve 200. As such, the controller 302 may continually adjust the pressure setting of the valve 200 during operation of the hydraulic circuit 300 based on the sensor information.

Figure 13:
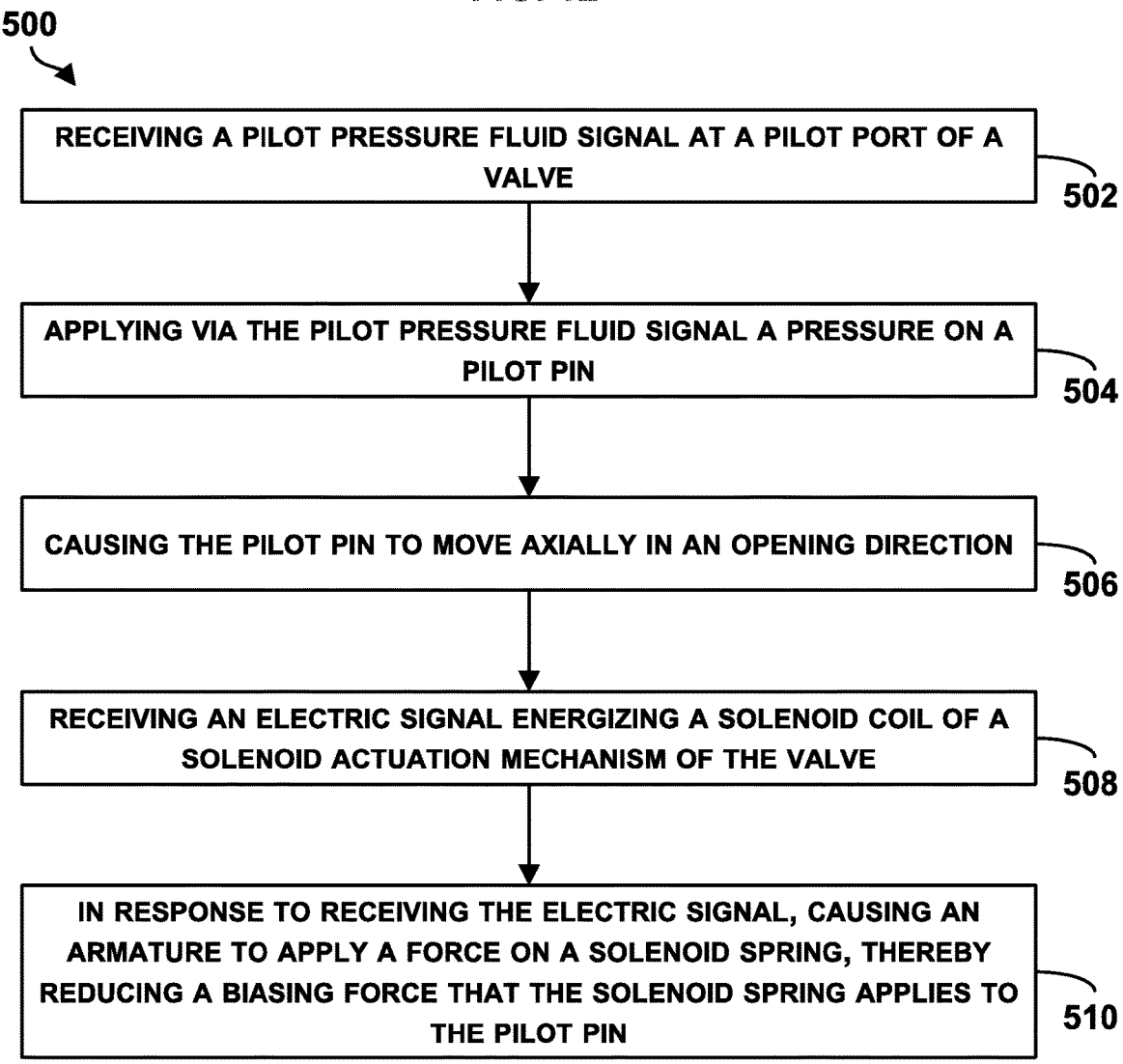
FIG. 13 illustrates is a flowchart of a method for operating a valve, in accordance with an example implementation.

FIG. 13 is a flowchart of a method 500 for operating a valve, in accordance with an example implementation. The method 500 shown in FIG. 13 presents an example of a method that could be used with the valve 200 shown throughout the Figures, for example. The method 500 may include one or more operations, functions, or actions as illustrated by one or more of blocks 502-510. Although the blocks are illustrated in a sequential order, these blocks may also be performed in parallel, and/or in a different order than those described herein. Also, the various blocks may be combined into fewer blocks, divided into additional blocks, and/or removed based upon the desired implementation. It should be understood that for this and other processes and methods disclosed herein, flowcharts show functionality and operation of one possible implementation of present examples. Alternative implementations are included within the scope of the examples of the present disclosure in which functions may be executed out of order from that shown or discussed, including substantially concurrent or in reverse order, depending on the functionality involved, as would be understood by those reasonably skilled in the art.

At block 502, the method 500 includes receiving the pilot pressure fluid signal at the pilot port 244 of the valve 200.

At block 504, the method 500 includes applying via the pilot pressure fluid signal a pressure on the pilot pin 226. The pilot pressure fluid signal is communicated through the cross hole 246 and slanted channel 248 to the gap 250 and the second annular groove 288 of the pilot pin 226, and the pilot pressure fluid signal then applies a pressure on the pilot pin 226 in the proximal direction.

At block 506, the method 500 includes causing the pilot pin 226 to move axially in an opening (proximal) direction. As the pilot pressure fluid signal acts on the areas $A_4$ and $A_3$ shown in FIG. 6, a force acts on the pilot pin 226 in the proximal or opening direction against the force applied to the pilot pin 226 via the solenoid spring 262. When the force that the pilot pressure fluid signal applies to the pilot pin 226 along with the force applied on the pilot pin 226 via the pressurized fluid received at the first port 212 and communicated to the first annular groove 286 reaches a particular force level that overcomes the biasing force of the solenoid spring 262, the pilot pin 226 moves in the opening direction.

At block 508, the method 500 includes receiving an electric signal energizing the solenoid coil 254 of the solenoid actuation mechanism 206 of the valve 200. A controller of the hydraulic system or hydraulic circuit (e.g., the hydraulic circuit 300) may receive information indicating a particular pressure level at a chamber of an actuator or indicating a magnitude of the load that the actuator is subjected to, and accordingly the controller may provide a command or electric signal to the solenoid coil 254 to adjust the pressure setting of the valve 200. As mentioned above, many other variables could be used to indicate the magnitude of the load that the actuator is subject to based on the application in which the actuator is used. Thus, any other type of sensor could be used to provide information to the controller that indicates the magnitude of the load or a change in magnitude of the load.

At block 510, the method 500 includes, in response to receiving the electric signal, causing the armature 256 to apply a force on the solenoid spring 262, thereby reducing the biasing force that the solenoid spring 262 applies to the pilot pin 226. Reducing the biasing force that the solenoid spring 262 applies to the pilot pin 226 reduces the pressure setting of the valve 200.

The detailed description above describes various features and operations of the disclosed systems with reference to the accompanying figures. The illustrative implementations described herein are not meant to be limiting. Certain aspects of the disclosed systems can be arranged and combined in a wide variety of different configurations, all of which are contemplated herein.

Further, unless context suggests otherwise, the features illustrated in each of the figures may be used in combination with one another. Thus, the figures should be generally viewed as component aspects of one or more overall implementations, with the understanding that not all illustrated features are necessary for each implementation.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

Further, devices or systems may be used or configured to perform functions presented in the figures. In some instances, components of the devices and/or systems may be configured to perform the functions such that the components are actually configured and structured (with hardware and/or software) to enable such performance. In other examples, components of the devices and/or systems may be arranged to be adapted to, capable of, or suited for performing the functions, such as when operated in a specific manner.

By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide The arrangements described herein are for purposes of example only. As such, those skilled in the art will appreciate that other arrangements and other elements (e.g., machines, interfaces, operations, orders, and groupings of operations, etc.) can be used instead, and some elements may be omitted altogether according to the desired results. Further, many of the elements that are described are functional entities that may be implemented as discrete or distributed components or in conjunction with other components, in any suitable combination and location.

While various aspects and implementations have been disclosed herein, other aspects and implementations will be apparent to those skilled in the art. The various aspects and implementations disclosed herein are for purposes of illustration and are not intended to be limiting, with the true scope being indicated by the following claims, along with the full scope of equivalents to which such claims are entitled. Also, the terminology used herein is for the purpose of describing particular implementations only, and is not intended to be limiting.

What is claimed is:

1. A valve comprising:
   a housing having a pilot port on an exterior peripheral surface of the housing;
   a piston axially movable within a sleeve disposed in the housing, wherein the sleeve defines a first port and a second port, and wherein the piston defines a cavity therein;
   a pilot pin received at, and axially movable in, the cavity of the piston, wherein the piston forms a pilot seat at which the pilot pin is seated when the valve is in a closed state; and
   a solenoid actuator comprising a solenoid coil, an armature, and a solenoid spring, wherein the solenoid spring applies a biasing force on the pilot pin in a distal direction to seat the pilot pin at the pilot seat,
   wherein when pressurized fluid is received at the first port, the pressurized fluid applies a first force on the pilot pin in a proximal direction opposite the distal direction, and when a pilot pressure fluid signal is received through the pilot port of the housing, the pilot pressure fluid signal applies a second force on the pilot pin in the proximal direction, such that when the first force and the second force overcome the biasing force of the solenoid spring, the pilot pin moves axially in the proximal direction off the pilot seat, thereby causing the piston to follow the pilot pin in the proximal direction allowing flow from the first port to the second port, and wherein when an electric signal is provided to the solenoid coil, the armature applies a third force on the solenoid spring in the proximal direction, thereby reducing the biasing force that the solenoid spring applies on the pilot pin.

2. The valve of claim 1, wherein the pilot pin comprises an annular groove on an exterior peripheral surface of the pilot pin, wherein the annular groove is bounded by a first annular surface area and a second annular surface area, wherein the annular groove is fluidly coupled to the first port such that the pressurized fluid received at the first port is communicated to the annular groove, wherein the first annular surface area is larger than the second annular surface area, such that the pressurized fluid applies a net force on the pilot pin in the proximal direction.

3. The valve of claim 2, wherein the piston comprises a channel formed therein, wherein the channel fluidly couples the first port to a chamber in which the annular groove is disposed when the valve is in the closed state.

4. The valve of claim 3, wherein the channel is a first channel, and wherein the piston comprises a second channel formed therein, wherein the second channel fluidly couples the chamber to the second port, such that when the pilot pin moves in the proximal direction off the pilot seat, fluid in the chamber is allowed to flow to the second port through the second channel.

5. The valve of claim 2, wherein the annular groove is a first annular groove, wherein the pilot pin comprises a second annular groove on the exterior peripheral surface of the pilot pin, wherein the second annular groove is bounded by a third annular surface area and a fourth annular surface area, wherein the second annular groove is fluidly coupled to the pilot port such that the pilot pressure fluid signal received at the pilot port is communicated to the second annular groove, wherein the fourth annular surface area is larger than the third annular surface area, such that the pilot pressure fluid signal applies a respective net force on the pilot pin in the proximal direction.

6. The valve of claim 5, further comprising:
a spacer disposed within the housing, wherein the spacer comprises a channel that fluidly couples the pilot port to the second annular groove.

7. The valve of claim 1, wherein the sleeve is a main sleeve, and wherein the solenoid actuator further comprises a solenoid sleeve coupled to the armature and configured to house the solenoid spring, wherein the solenoid spring is disposed between a proximal spring cap and a distal spring cap, wherein the distal spring cap interfaces with the solenoid sleeve, such that when the armature moves in the proximal direction, the solenoid sleeve moves therewith, thereby applying the third force on the solenoid spring via the distal spring cap.

8. The valve of claim 1, wherein the piston is a main piston, and wherein the valve further comprises:
a reverse flow piston disposed at the first port in the sleeve and axially movable within the sleeve; and
a reverse flow check spring that biases the reverse flow piston toward the main piston, such that the reverse flow piston operates as a piston seat for the main piston when the valve is in the closed state, wherein when pressurized fluid is received at the second port, the pressurized fluid applies a force on the reverse flow piston in the distal direction against the reverse flow check spring causing the reverse flow piston to move axially within the sleeve in the distal direction, thereby allowing flow of the pressurized fluid from the second port to the first port.

9. A valve comprising:
a housing having a pilot port on an exterior peripheral surface of the housing;
a main stage comprising: (i) a main sleeve disposed in the housing and defining a first port and a second port, and (ii) a piston axially movable within the main sleeve, wherein the piston defines a cavity therein;
a pilot stage comprising a pilot pin received at, and axially movable in, the cavity of the piston, wherein the piston forms a pilot seat at which the pilot pin is seated when the valve is in the closed state; and
a solenoid actuator comprising a solenoid coil, an armature, a solenoid spring, and a solenoid sleeve coupled to, and axially movable with, the armature, wherein the solenoid sleeve houses the solenoid spring and interfaces therewith, wherein the solenoid spring applies a biasing force in a distal direction on the pilot pin to seat the pilot pin at the pilot seat, wherein energizing the solenoid coil causes the armature and the solenoid sleeve coupled thereto to apply a force on the solenoid spring in a proximal direction, thereby reducing the biasing force that the solenoid spring applies on the pilot pin in the distal direction.

10. The valve of claim 9, wherein the pilot pin comprises: (i) a first annular groove on an exterior peripheral surface of the pilot pin, wherein the first annular groove is fluidly coupled to the first port, (ii) and a second annular groove on the exterior peripheral surface of the pilot pin, wherein the second annular groove is fluidly coupled to the pilot port.

11. The valve of claim 10, wherein the first annular groove is bounded by a first annular surface area and a second annular surface area, wherein the first annular surface area is larger than the second annular surface area, and wherein the second annular groove is bounded by a third annular surface area and a fourth annular surface area, wherein the fourth annular surface area is larger than the third annular surface area.

12. The valve of claim 10, wherein the pilot stage further comprises a spacer that is ring-shaped such that the pilot pin is disposed through the spacer, wherein the spacer is disposed axially adjacent to the piston such that a chamber is formed between the spacer and the piston, wherein the first annular groove is disposed in the chamber when the valve is in the closed state.

13. The valve of claim 12, wherein the piston comprises a channel formed therein, wherein the channel fluidly couples the first port to the chamber.

14. The valve of claim 13, wherein the channel is a first channel, and wherein the piston comprises a second channel formed therein, wherein the second channel is configured to fluidly couple the chamber to the second port when the pilot pin moves axially off the pilot seat.

15. The valve of claim 12, wherein the spacer is a first spacer, wherein the pilot stage further comprises:
a second spacer abutting the first spacer; and
a third spacer adjacent the second spacer, wherein the pilot pin is disposed through the second spacer and the third spacer, wherein the second spacer and the third spacer form a gap therebetween, wherein the third spacer comprises a channel configured to fluidly couple the pilot port to the gap, and wherein the second annular groove is fluidly coupled to the gap.

16. A hydraulic system comprising:
a source of pressurized fluid;
a reservoir;
a hydraulic actuator having a first chamber and a second chamber;
a directional control valve configured to direct fluid flow from the source of pressurized fluid to the first chamber of the hydraulic actuator; and
a valve configured to control fluid flow from the second chamber, wherein the valve comprises:
a housing having a pilot port on an exterior peripheral surface of the housing, wherein the pilot port is fluidly coupled to the first chamber of the hydraulic actuator,
a main stage comprising: (i) a main sleeve defining a first port and a second port, wherein the first port is fluidly coupled to the second chamber, and wherein the second port is fluidly coupled to the reservoir, and (ii) a piston axially movable within the main sleeve, wherein the piston defines a cavity therein,
a pilot stage comprising a pilot pin received at, and axially movable in, the cavity of the piston, wherein the piston forms a pilot seat at which the pilot pin is seated when the valve is in the closed state, wherein the pilot pin is subjected to pressurized fluid received at the first port and subjected to a pilot pressure fluid signal received at the pilot port, and
a solenoid actuator comprising a solenoid coil, an armature, a solenoid spring, and a solenoid sleeve coupled to, and axially movable with, the armature and configured to house the solenoid spring, wherein the solenoid spring applies a biasing force in a distal direction on the pilot pin to seat the pilot pin at the pilot seat, wherein energizing the solenoid coil causes the armature and the solenoid sleeve coupled thereto to apply a force on the solenoid spring in a proximal direction, thereby reducing the biasing force that the solenoid spring applies on the pilot pin.

17. The hydraulic system of claim 16, wherein the pilot pin comprises: (i) a first annular groove on an exterior peripheral surface of the pilot pin, wherein the first annular groove is fluidly coupled to the first port, (ii) and a second annular groove on the exterior peripheral surface of the pilot pin, wherein the second annular groove is fluidly coupled to the pilot port.

18. The hydraulic system of claim 17, wherein the first annular groove is bounded by a first annular surface area and a second annular surface area, wherein the first annular surface area is larger than the second annular surface area, and wherein the second annular groove is bounded by a third annular surface area and a fourth annular surface area, wherein the fourth annular surface area is larger than the third annular surface area.

19. The hydraulic system of claim 17, wherein the pilot stage further comprises:
a first spacer;
a second spacer abutting the first spacer; and
a third spacer adjacent to the second spacer, wherein:
the first spacer, the second spacer, and the third spacer are ring-shaped such that the pilot pin is disposed therethrough,
the first spacer is disposed axially adjacent to the piston such that a chamber is formed between the first spacer and the piston, wherein the first annular groove is disposed in the chamber when the valve is in the closed state, and
the second spacer and the third spacer form a gap therebetween, wherein the third spacer comprises a channel configured to fluidly couple the pilot port to the gap, and wherein the second annular groove is fluidly coupled to the gap.

20. The hydraulic system of claim 19, wherein the piston comprises:
a first channel formed therein, wherein the first channel fluidly couples the first port to the chamber, and
a second channel formed therein, wherein the second channel is configured to fluidly couple the chamber to the second port when the pilot pin moves axially off the pilot seat.

* * * * *